United States Patent
Campbell

(10) Patent No.: US 7,076,505 B2
(45) Date of Patent: Jul. 11, 2006

(54) METHOD, APPARATUS, AND COMPUTER PROGRAM PRODUCT FOR PROVIDING A GRAPHICAL USER INTERFACE WITH A LINEAR MAP COMPONENT

(75) Inventor: Geoffrey Michael Campbell, Williamsport, PA (US)

(73) Assignee: Metrobot LLC, Williamsport, PA (US)

( * ) Notice: Subject to any disclaimer, the term of this patent is extended or adjusted under 35 U.S.C. 154(b) by 887 days.

(21) Appl. No.: 10/193,503

(22) Filed: Jul. 11, 2002

(65) Prior Publication Data

US 2004/0008225 A1 Jan. 15, 2004

(51) Int. Cl.
*G06F 17/00* (2006.01)

(52) U.S. Cl. .................. 707/104.1; 345/764; 701/207; 701/200; 340/990

(58) Field of Classification Search ............. 707/104.1; 340/990; 701/200–211
See application file for complete search history.

(56) References Cited

U.S. PATENT DOCUMENTS

| | | | |
|---|---|---|---|
| 5,974,357 A * | 10/1999 | Poonsaengsathit et al. | 701/210 |
| 5,988,853 A | 11/1999 | Kim et al. | |
| 6,091,417 A | 7/2000 | Lefkowitz | |
| 6,144,920 A | 11/2000 | Mikame | |
| 6,154,219 A * | 11/2000 | Wiley et al. | 345/587 |
| 6,240,360 B1 | 5/2001 | Phelan | |
| 6,542,817 B1 * | 4/2003 | Miyaki | 701/209 |
| 6,571,169 B1 * | 5/2003 | Miyaki | 701/200 |
| 6,640,185 B1 * | 10/2003 | Yokota et al. | 701/208 |
| 6,836,723 B1 * | 12/2004 | de Silva | 701/200 |

* cited by examiner

*Primary Examiner*—Mohammad Ali
*Assistant Examiner*—Sathyanarayan Pannala

(57) ABSTRACT

The present invention comprises a method, apparatus, and computer program product for providing a graphical user interface (GUI) with a linear map component. A database that includes data representing transportation segments and point of interest (POI) features is employed. Once the desired location is determined, the data relating to it is extracted from the database and presented to the user in a GUI in which individual transportation segments along the predetermined route or projected path of travel are shown in a linear format. The linear formatted segments are oriented vertically in the map display or printout in order to easily accommodate the display of textual information and/or links associated with POIs along the path of travel. Further information is displayed pursuant to user selection of links or icons in the main GUI screen.

24 Claims, 22 Drawing Sheets

|  | Center Ave |  |  |
|---|---|---|---|
|  | 538 | 539 |  |
| W 5th St |  |  | E 5th St |
|  |  | 537 | Sue's Place |
|  |  | 533 | Kids Kare [LINK] |
|  |  | 521 | Discount Shoe |
|  |  | 511 | West Realty [LINK] |
|  |  | 505 | China Garden |
|  |  | 501 |  |
| W 4th St |  |  | E 4th St |
|  | 498 | 499 |  |
| Red Oak Hotel | 490 |  |  |
|  |  | 485 | King Barbers |
| Country Candles | 474 |  |  |
| [LINK] Curl & Cut | 474 |  |  |
| JR Cards & Gifts | 474 |  |  |
| Lilly Laundromat | 474 |  |  |
| Pied Piper Toys | 474 |  |  |
| Mia's Cleaning | 474 |  |  |
|  |  | 469 | Broom Financial |
|  |  | 469 | Citizen's Bank |
|  |  | 469 | Quick Copy [LINK] |
|  |  | 469 | R & S Consulting |
| Video Express | 456 |  |  |
|  |  | 459 | Bell Auto Parts |
| W 3rd St |  |  | E 3rd St |
|  | 454 | 457 |  |
|  | Center Ave |  |  |

FIG. 10

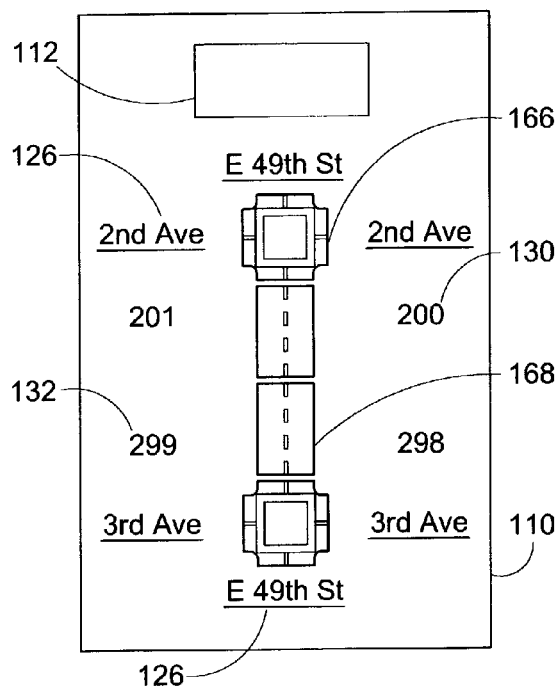
FIG. 11A
FIG. 11B
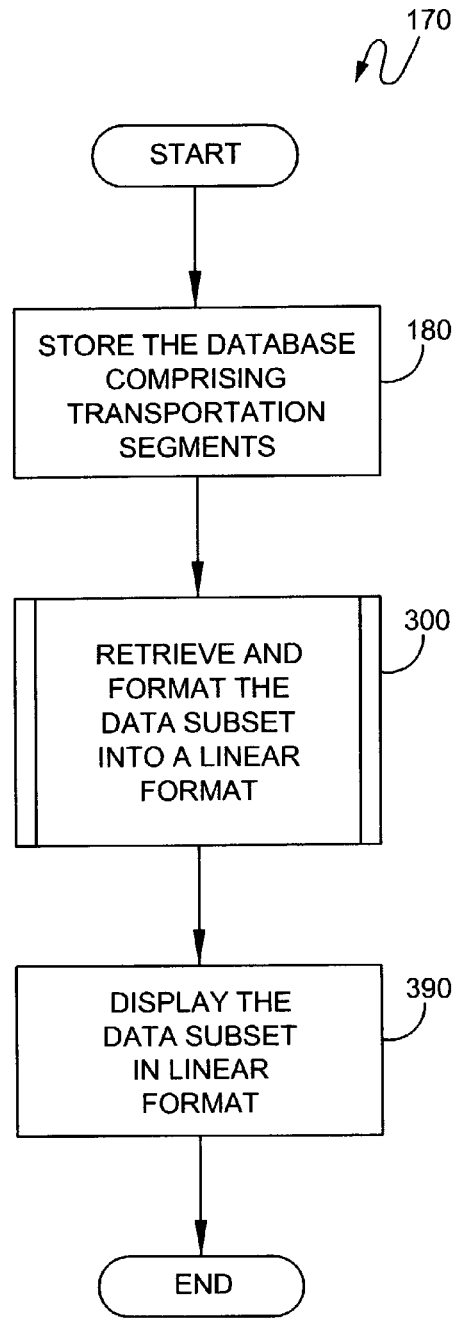
FIG. 12

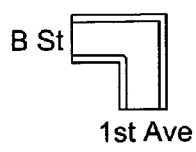
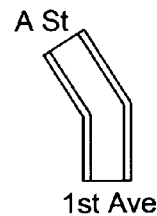
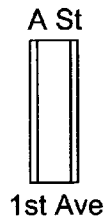
FIG. 22A  FIG. 22B  FIG. 23A  FIG. 23B
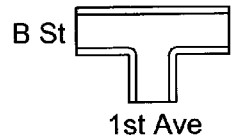
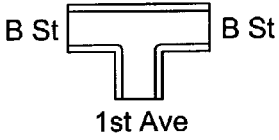
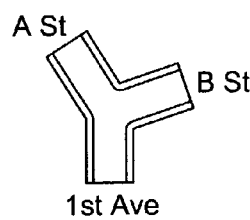
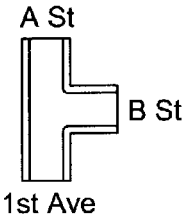
FIG. 24A  FIG. 24B  FIG. 25A  FIG. 25B
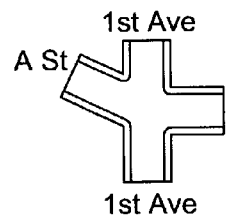
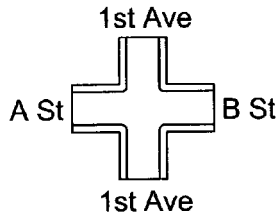
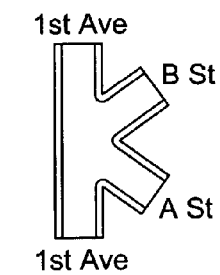
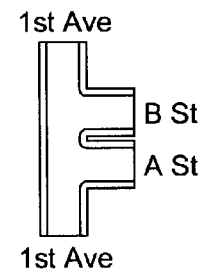
FIG. 26A  FIG. 26B  FIG. 27A  FIG.27B
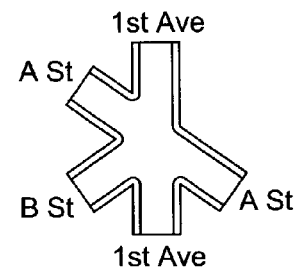
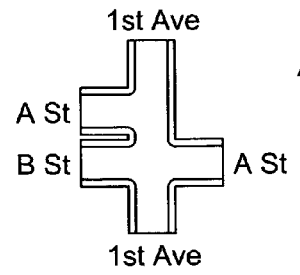
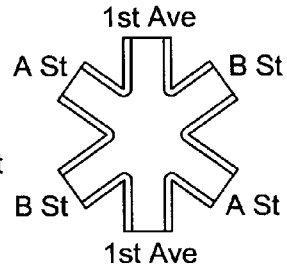
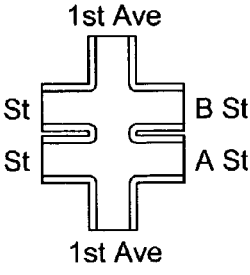
FIG.28A  FIG. 28B  FIG. 29A  FIG. 29B

```
                        Center Ave

538 |    | 539
                    ----      ----
    W 5th St                           E 5th St
                    ----      ----
                        |    | 537  Sue's Place
                        |    | 533  Kid's Kare
                        |    | 521  Discount Shoe
                        |    | 511  West Realty
                        |    | 505  China Garden
                        |    | 501
                    ----      ----
    W 4th St                           E 4th St
                    ----      ----
                    498 |    | 499
    Red Oak Hotel   490 |    |
                        |    | 485  King Barbers
    Country Candles 474 |    |
        Curl & Cut  474 |    |
    JR Cards & Gifts 474 |   |
    Lilly Laundromat 474 |   |
      Pied Piper Toys 474 |  |
       Mia's Cleaning 474 |  |
                        |    | 469  Broom Financial
                        |    | 469  Citizen's Bank
                        |    | 469  Quick Copy
                        |    | 469  R & S Consulting
    Video Express   456 |    |
                        |    | 459  Bell Auto Parts
                    ----      ----
    W 3rd St                           E 3rd St
                    ----      ----
                    454 |    | 457
                        Center Ave
```

FIG. 34

METHOD, APPARATUS, AND COMPUTER PROGRAM PRODUCT FOR PROVIDING A GRAPHICAL USER INTERFACE WITH A LINEAR MAP COMPONENT

FEDERALLY SPONSORED RESEARCH

Not Applicable

SEQUENCE LISTING OR PROGRAM

Not Applicable

BACKGROUND OF THE INVENTION

1. Field of the Invention

The present invention generally relates to graphical user interfaces, geographical maps, business directories, online search engines, and in car navigation systems. More particularly, the present invention relates to a method, apparatus, and computer program product for providing a graphical user interface with a linear map component incorporating graphical information related to transportation segments such as highways, roads, railroads, subways, and rivers, in conjunction with textual information relating to points of interest (POIs) that are located along the depicted transportation segments.

2. Description of the Prior Art

There are many situations where a person needs to know detailed information associated with a specific transportation segment such as a road. This detailed information may be in the form of address ranges, intersecting street names, or the names of associated POIs (such as business or residential entities) occurring along a specified roadway. For example, a person may need to find the name of the intersecting street closest to a specified address, or the names and locations of all restaurants occurring near a downtown office tower.

In earlier times, this type of information was recorded manually on paper maps. These maps were meticulously drawn by hand and updated in a laborious process whenever changes occurred. This type of map can still be found today, but as technology has become more sophisticated, computerized mapping systems have been developed.

Two-dimensional maps in which directed line segments represent roads can be generated either manually, or through the use of computers by reading from a database of geographic information. Highways, roads, and cities are located on such maps based upon their associated latitude and longitude coordinates. With the incorporation of shape information depicting curvilinear map features, computer generated and displayed maps are identical in appearance to geographically accurate manually generated paper maps.

Although it is relatively easy to graphically depict the streets occurring within a designated geographic region, it is somewhat more difficult to show textual information including point of interest (POI) designators such as the names of hotels, restaurants, and various other POIs falling within the designated region. In the more densely developed areas of the city, there may not be room to display the names of all of these entities. A high-rise office building, for example, may have dozens, if not hundreds of businesses associated with the same street address. Furthermore, the streets may be oriented in such a way that it becomes difficult or awkward to incorporate textual POI designators (as would be the case if the street were oriented horizontally across the display).

Due to the difficulty of incorporating large amounts of textual data with maps, most previous attempts at solving this problem have taken the "pushpins" approach whereby a small icon is displayed at each POI location. An example of this type of approach can be found in the prior art FIG. 7 and is referred to here as the pushpins 2 approach. In this case, the icons consist of small boxes containing numbers that are related to individual POIs. The user would have to either click on an individual icon or look at a corresponding legend to determine the name of the specific POI in question. Note that in the pushpins 2 part of the map depicted in FIG. 7 the density of POIs displayed results in the overlapping of icons, whereby individual icons can no longer be clearly distinguished. In other prior art cases, different icons are used to depict POIs of different types. For example, a restaurant icon might show a fork and a spoon, and a hotel icon might show a small building with a gable roof. This additional level of information is beneficial, but does not overcome the problem of overlapping icons as described above.

Another approach, depicted above E 4th Street in FIG. 7, shows POI names near the associated icons 4. Here again, we run into the same density problems, resulting at times, in overlapping, and unreadable text. Although the POI names near the associated icons 4 do not overlap one another, it is easy to see that this condition would occur in areas of the map where the icons overlap. The high-rise office building example stated above would also pose problems if one were to attempt to display the names of all businesses located in the building. The example with the POI names near the associated icons 4 in FIG. 7 works reasonably well partly because of the orientation of the road on which the POIs occur. If however, text were to be added to a series of closely spaced POI icons placed horizontally along E 5th Street, problems with overlapping would likely arise.

It is the non-uniform and curving nature of the typical city road network that makes the incorporation of related textual information difficult. The problem of representing data associated with curving roadways has been explored previously in the development of the straight-line diagram (also sometimes referred to as a strip map). FIG. 9 depicts an example of a straight-line diagram 6 in the prior art generated by the New Jersey Department of Transportation. These diagrams overcome the difficulty of depicting the lengths of contiguous curving road segments by showing these segments as a straight horizontal line. The example in FIG. 9 shows the straight-line diagram 6 for Monmouth Street near the center of the figure. Directly above the straight-line diagram 6 is a map highlighting Monmouth Street 8 as it would appear in a typical two-dimensional map. The use of straight-line diagrams by state highway departments has recently fallen out of favor as computerized Geographic Information Systems have come to prominence. To date, straight-line diagrams have been employed as printed maps. Although such maps can be accessed via computer systems, they permit no user interactivity beyond the viewing of the map image.

On-line computer systems, such as the Internet, are well known in the art. The Internet is a giant network connecting numerous networks together to enable access to a wide array of information. A home computer with an Internet connection accesses this information via a software interface known as a web browser. Unique Internet addresses are entered into the web browser to specify web sites relating to virtually every topic imaginable. Internet documents consisting of textual and graphical information are typically encoded in Hypertext Markup Language (HTML). HTML formatted documents often include hypertext links (or links). Hypertext links are user selectable words, phrases, or pictures that enable users to access the display of one informational content element from another. For a more detailed description of the Internet please refer to "Internet: The Complete Reference, Millennium Edition" by Margaret Levine Young, published by McGraw-Hill, 1999.

Most online mapping systems deliver maps to the user in the form of bitmap image files. Such files store information relating to each individual pixel in the map image. Larger images, having a larger number of pixels, typically result in larger file sizes. When a user accesses a map over a computer network such as the Internet, image files are often the bottleneck resulting in long periods of waiting while the files are downloaded. This problem is exacerbated when low bandwidth mobile devices such as cell phones, personal digital assistants (PDAs), and various other handheld computers are employed to access data over the Internet. These devices currently require that the size of data transmissions be as small as possible. They also have very small display screens that can't typically show as much information as a standard desktop computer monitor.

Internet based search engines can be very helpful in locating information related to specific subjects or entities. Most search engines, however, attempt to include (or index) as many web pages as possible. Therefore, when searching for information related to a specific entity, or to a specific branch or office of a company, the search engine is likely to return a multitude of links to related web pages. Anyone looking to access the primary web page associated with the branch of a company at a specific geographic location will often have to search through a large list to find it.

In car navigation systems, which are well known in the art, provide another possible means of accessing location based information (via the Internet or other sources). In this mobile environment, the user typically would be less willing to spend time searching for the desired POI information than would a user with a home computer. Providing mobile users, and specifically automobile based users with the desired link in a timely fashion is a top priority.

Many maps or mapping applications display information that is not needed by the map user, while excluding information that could be helpful. A person walking or driving down a specific road may not care to see depictions of nearby non-intersecting roads, but might be very interested in seeing address ranges for road along his or her traveled route.

Accordingly, a need exists for a solution that overcomes the above-noted drawbacks associated with existing approaches and systems.

SUMMARY OF THE INVENTION

In accordance with the foregoing, several objects and advantages of the present invention are:
a) to provide a graphical user interface that enables easy incorporation of substantial amounts of map related text based information, such as the names of POIs or businesses which appear along either side of a road;
b) to provide a graphical user interface which results in relatively small file sizes which can be sent rapidly over limited bandwidth communications networks;
c) to provide a graphical user interface which can be displayed and easily comprehended on the small display screens found in mobile communications devices such as cellular telephones, PDAs, and other handheld computers;
d) to provide a graphical user interface which can be used with a location based search engine or in car navigation system to link to and cause the display of only those primary informational elements associated with the various POIs depicted in the map area;
e) to provide a graphical user interface without extraneous information wherein only the information most relevant to the map user is displayed;
f) to provide a graphical user interface which employs industry standard file formats in order to reach the largest possible audience;

In order to accomplish these objects the present invention comprises a method, apparatus, and computer program product for providing a graphical user interface with a linear map component. A database comprising data representing the geographic and POI features in the covered region is employed. Once the desired location in the covered region is determined, a data subset relating to it is extracted from the database, formatted into a linear format, and displayed.

In one aspect of the invention, only the transportation segments (comprising roads, alleys, highways, water features, and subways) are displayed. This data is formatted in a graphical user interface in which individual transportation segments along a user's path of travel are shown in a vertically oriented, linear fashion. Optionally, address ranges of individual roads may be displayed.

In another aspect of the invention both the transportation segments and associated POI designators (including textual names and graphical icons such as business logos) and related data (such as POI address numbers) are displayed. POIs that have associated informational pages (including web pages) are represented with links. The textual display of business names and/or links associated with POIs along the path of travel is easily accommodated due to the vertical orientation of the linear formatted transportation segments.

In yet another aspect of the invention, demographic type data is displayed as color-coded or pattern coded regions on either side of the specified transportation segments.

For a further understanding of the nature and advantages of the invention, reference should be made to the following detailed description taken in conjunction with the accompanying drawings.

BRIEF DESCRIPTION OF THE DRAWINGS

FIG. 10 is an illustration depicting the use of an HTML table in the generation of a linear format for a first embodiment of the present invention;

FIG. 11A is an illustration depicting the use of WML in the generation of a linear format for a first embodiment of the present invention;

FIG. 11B illustrates how a portion of the screen depicted in FIG. 11A is formatted as a WML table for a first embodiment of the present invention;

FIG. 12 is a flow chart illustrating the overall method employed for a first embodiment of the present invention;

FIGS. 22A through 29B illustrate how specific instances of road intersections are represented in an HTML table format for a first embodiment of the present invention;

FIG. 34 is an illustration depicting an alternative embodiment of the present invention in the form of an email text message;

REFERENCE NUMERALS IN THE DRAWINGS

Figure 1:
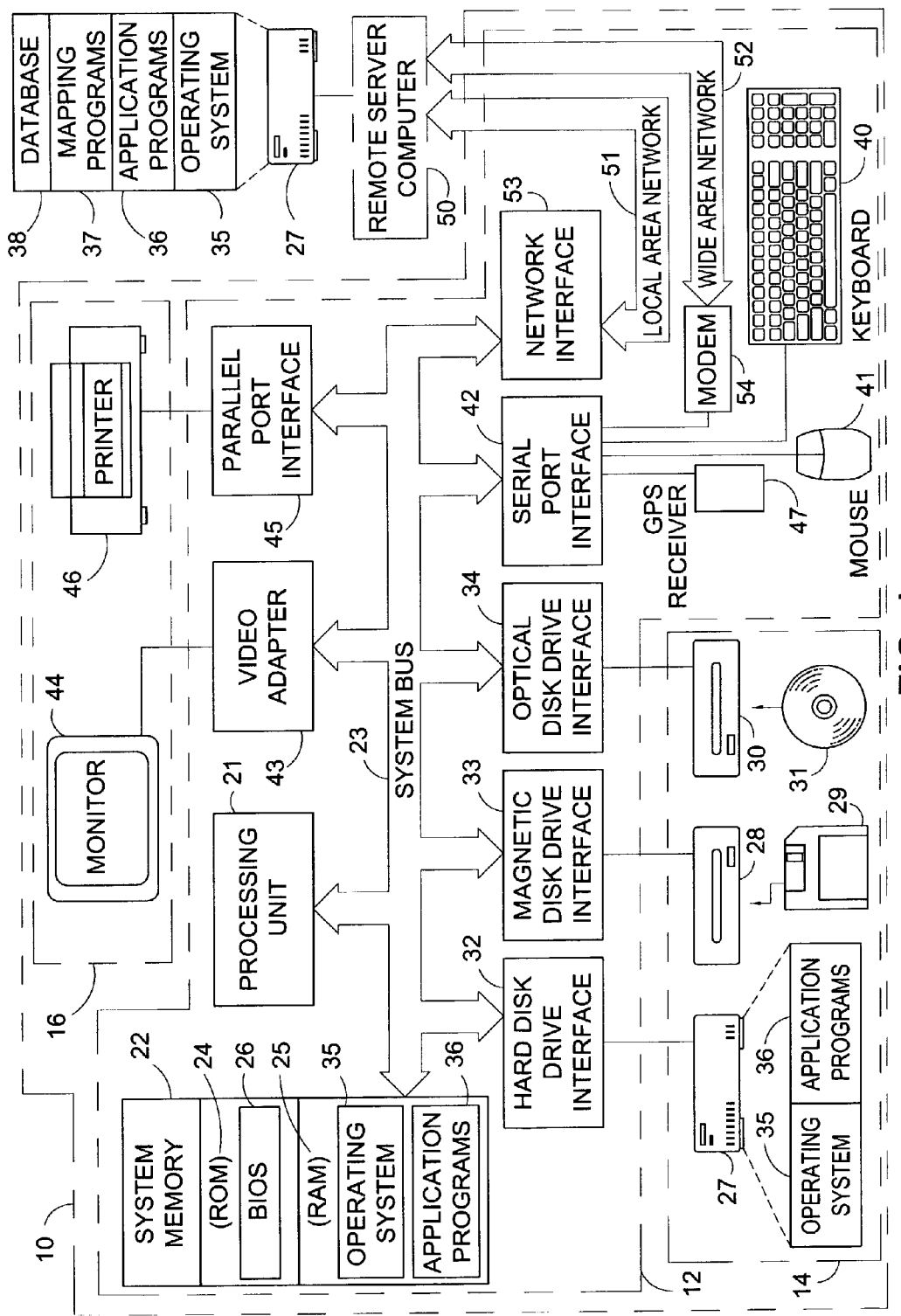
FIG. 1 is a block diagram of an apparatus illustrating an operating environment for a first embodiment of the present invention.

2 Pushpins
4 POI Names Near the Associated Icons
5 Park
6 Straight-Line Diagram
8 Map Highlighting Monmouth Street
10 Personal Computer
12 Controller Means
14 Memory
16 Display Means
21 Processing Unit
22 System Memory
24 Read Only Memory (ROM)
25 Random Access Memory (RAM)
26 Basic Input/Output System (BIOS)
27 Hard Disk Drive
28 Magnetic Disk Drive
29 Removable Disk
30 Optical Disk Drive
31 CD-ROM Disk
32 Hard Disk Drive Interface
33 Magnetic Disk Drive Interface
34 Optical Disk Drive Interface
35 Operating System
36 Application Programs
37 Mapping Programs
38 Database
40 Keyboard
41 Mouse
42 Serial Port Interface
43 Video Adapter
44 Monitor
45 Parallel Port Interface
46 Printer
47 Global Positioning System (GPS) Receiver
50 Remote Server Computer
51 Local Area Network (LAN)
52 Wide Area Network (WAN)
53 Network Interface
54 Modem
60 Web Browser
62 HTTP Request
64 Internet or Intranet
66 Elements Associated With the Remote Server Computer
68 Web Server
70 COLDFUSION (CF) Page
72 COLDFUSION Server
74 Web Page
76 Open Database Connectivity (ODBC)
78 Database Driver
80 Start Node
82 Intermediate Shape Points
84 End Node
90 ADDRESS Table
91 ST NAME Table
92 LATLONG Table
93 NODE Table
94 TLID Table
95 ST ZIP Table
96 ZIP CITY Table
97 POI INFO Table
98 GEOCODE Table
110 Main Graphical User Interface (GUI) Screen
112 Search Link
120 Bottom Intersection Node
122 Projected Path of Travel Segment
124 Top Intersection Node
126 Transportation Segment Name (which also serves as a Transportation Segment Link)
128 Hatched Area Representing a Park 130 "FROM" Node Left Address Range
132 "TO" Node Right Address Range
134 User Position Icon (UPI)
140 Point of Interest (POI) Designator
142 POI Address Numbers
144 POI Links
146 Predetermined Route Graphic
148 Yellow Center Stripe
150 Demographic Data
160 Info Popup
162 Web Site
164 Web Site Pages
166 Intersection GIF Image
168 Road Section GIF Image
170 Overall Method Flowchart
180 Store the Database Comprising Transportation Segments
202 Display "Main Search" Screen
203 Pick Desired City
204 Desired Street Name and Spelling Known?
206 Input Street or Address
208 Select "Find Address or Street" Button
210 Parse the Address String
212 Retrieve Matching Streets
214 Number of Matches Found?
216 Display "Street Not Found" Screen
218 Select Street
220 Select "Find Address or Street" Button
222 Pick First Letter
224 Display "Street List" Screen
226 Select Street From List
228 Designate Intersection?
230 Select "Find Intersection" Button
232 Display "Intersection Selection" Screen
234 Select Intersecting Street
236 Select "Find Intersection" Button
240 "Main Search" Screen
242 City Drop Down List
244 Address Entry Box
246 First Character Drop Down List
248 Map Width Radio Buttons
250 "Find Address or Street" Button
252 Address String
260 "Street Not Found" Screen
262 Text String Relating the Currently Specified City
264 Address Number Entry Box
266 Street Selection List
270 Parsed Address Number
280 "Street List" Screen
286 "Find Intersecting Street" Button
290 "Intersection Selection" Screen
294 Intersecting Street Selection List
296 "Find Intersection" Button
300 Retrieve and Format the Data Subset into a Linear Format
302 Retrieve Bottom Node Intersection Segments
306 Number of Intersection Segments>0?
310 Output Intersection
314 Determine Segment Opposite to Current Segment
316 Count Segments on Left and Right Side of Intersection
318 Number of Left Segments>Number of Segments on Right?
320 For Each Segment on Right, Determine Which Segment on Left is Opposite
322 For Each Segment on Left, Determine Which Segment on Right is Opposite
324 Output All Intersection Data
327 Segment Intersecting on Left?
328 Output Blank Cells & Sidewalk
329 Output Transportation Segment Name and Link on the Left
330 Output Left Intersecting Segment
331 Output Center Slice of Intersection
332 Segment Intersecting on Right?
333 Output Sidewalk & Blank Cells
334 Output Right Intersecting Segment
335 Output Transportation Segment Name and Link on the Right
336 More Intersection Segments?
337 Opposite Segment Becomes the New Current Segment
338 Output a Projected Path of Travel Segment
339 Retrieve Bottom Node Address Ranges
340 Output Bottom Node Left Address Range Number
341 Output Road Slice
342 Output Left Sidewalk
343 Output Center Part of Road
344 Condition Graphic?
345 Output Condition Graphic
346 User Position Icon (UPI)?
348 Output UPI
349 Output Right Sidewalk
350 Output Bottom Node Right Address Range Number
351 Retrieve Point of Interest (POI) Designators
352 Output POI Designators
353 Number of POI Designators>0?
354 Output Blank Cells, Long Road Slice & Blank Cells
355 Using Scrollable List Boxes?
356 Output Left List Box
357 Output Long Road Slice
358 Output Right List Box
359 POI Designator to Output?
360 Address Number on Right Side of Road?
361 Output POI Links, POI Designator, & Address Number
362 Output Blank Cells on Right
363 Output Blank Cells on Left
364 Output Address Number, POI Designator, & POI Links
368 Retrieve Top Node Address Ranges
370 Output Top Node Left Address Range Number
374 Output Top Node Right Address Range Number
380 Retrieve Top Node Intersection Segments
382 Number of Top Intersection Segments>0?
384 More Projected Path of Travel Segments?
390 Display the Data Subset in a Linear Format
410 Middle Intersection
412 Streetlights
414 Stop Signs
416 Condition Graphic
420 Scrollable List Box
422 Slider
424 Scroll Bar
426 Up and Down Arrow Buttons
428 Mailbox Icon
430 Public Telephone Icon
432 Public Restroom Icon
450 Process to Automatically Update Slider Position in Scrollable List Boxes
452 Receive Updated User Position Location Data
454 Update Depicted Location of User Position Icon
456 Is There A Scrollable List Box to Update?
460 User Position Icon Above Transportation Segment?
462 Move Slider to Top of Scroll Bar
464 User Position Icon Below Transportation Segment?
466 Move Slider to Bottom of Scroll Bar 468 Position Slider Along Scroll Bar in Proportion to Location of User Position Icon Along Length of Transportation Segment While the invention is susceptible to various modifications and alternative forms, specific embodiments thereof have been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE PRESENTLY PREFERRED EMBODIMENTS

First Embodiment

FIG. 1 and the following discussion are intended to provide a brief, general description of a suitable apparatus for implementing the invention. While the invention will be described in the general context of a distributed computing environment where tasks are performed by remote processing devices that are connected through a communications network, those skilled in the art will recognize that the invention also may be implemented in non-distributed computing environments such as in the case of an application program running on an operating system in conjunction with a personal computer or other computing device. In a distributed computing environment, program modules comprising routines, programs, components, and data structures that perform particular tasks or implement particular abstract data types may be located in both local and remote memory storage devices. Those skilled in the art will appreciate that the invention may be practiced in combination with other program modules and other computer system configurations, including hand-held devices, multi-processor systems, minicomputers, mainframe computers, microprocessor-based or programmable consumer electronics devices such as smart phones, set-top boxes, game consoles, and Internet appliances, and the like.

With reference to FIG. 1, the first embodiment of the apparatus for implementing the invention is executable on a personal computer 10 connected to a remote server computer 50 in a distributed computing environment. The personal computer 10 and the remote server computer 50 each comprise a controller means 12, a memory 14, and a display means 16. For each computing system, the controller means 12 is operatively connected to the memory 14, and display means 16 of that system. In response to a location being supplied to the controller means 12 of the remote server computer 50, a data subset is retrieved from the database 38 and formatted by the remote server controller means 12, as will be described hereinafter, into a linear format in accordance with the present invention. The linear formatted data is then sent by the remote server controller means 12 to the personal computer 10 which then relays this information to its display means 16, which includes a monitor 44, a printer 46, and the like. Aside from the Global Positioning System (GPS) receiver 47 depicted in FIG. 1, the remote server computer 50 includes all of the elements described below relative to the personal computer 10 (although only a hard disk drive 27 has been illustrated). Additionally, the remote server computer 50 includes computer mapping programs 37, and a database 38. The mapping programs 37 include programs to retrieve and format data from the database 38 into a graphical user interface with a linear map component.

The controller means 12, includes a processing unit 21, a system memory 22, and a system bus 23 that couples the system memory 22 to the processing unit 21. The system memory 22 includes read only memory (ROM) 24 and random access memory (RAM) 25. A basic input/output system 26 (BIOS), containing the basic routines that help to transfer information between elements within the personal computer 10, such as during start-up, is stored in ROM 24. A number of program modules may be stored in the memory 14 and RAM 25, including an operating system 35, and one or more application programs 36. A user may enter commands and information into the personal computer 10 through a keyboard 40 and a pointing device, such as a mouse 41. Both the keyboard 40 and the mouse 41 are connected to the system bus 23 via the serial port interface 42. The GPS receiver 47, which is a location determining device generally known in the art, is also connected to the serial port interface 42. The GPS receiver 47 detects the device's present position based on a signal transmitted from a satellite and transmits the detected present position to other elements of the controller means 12 via the serial port interface 42 and the system bus 23. Other input devices (not shown) may include a microphone, joystick, game pad, tracker ball, light pen, stylus pen, remote control, touch screen, satellite dish, scanner, or the like. These and other input devices are often connected to the processing unit 21 through a serial port interface 42 that is coupled to the system bus 23, but may be connected by other interfaces, such as a game port or universal serial bus.

The memory 14 comprises a hard disk drive 27, a magnetic disk drive 28, e.g., to read from or write to a removable disk 29, and an optical disk drive 30, e.g. for reading a CD-ROM disk 31 or to read from or write to other optical media. The hard disk drive 27, magnetic disk drive 28, and optical disk drive 30 are connected to the system bus 23 of the controller means 12 by a hard disk drive interface 32, a magnetic disk drive interface 33, and an optical disk drive interface 34, respectively. The drives and their associated computer readable media provide nonvolatile storage for the personal computer 10. Program modules such as an operating system 35, and one or more application programs 36, may be stored in the drives. Although the description of the memory 14 above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment. Program modules designed to implement the present invention manufactured in the form of read only system memory would also fall under the general classification as memory 14.

Additionally, the personal computer 10 includes a display means 16 comprising a monitor 44, and a printer 46. The monitor 44 is connected to the system bus 23 of the controller means 12 via a video adapter 43. The printer 46 is similarly connected to the system bus 23 via a parallel port interface 45. In addition to the monitor and printer, personal computers typically include other peripheral output devices (not shown), such as speakers.

The logical connections depicted in FIG. 1 include a local area network (LAN) 51 and a wide area network (WAN) 52. Such networking environments are commonplace in offices, enterprise-wide computer networks, intranets and the Internet. When used in a LAN networking environment, the personal computer 10 is connected to the LAN 51 through a network interface 53. When used in a WAN networking environment, the personal computer 10 typically includes a modem 54 or other means for establishing communications over the WAN 52, such as the Internet. The modem 54, which may be internal or external, is connected to the system bus 23 via the serial port interface 42. In a network environment, program modules or portions thereof, may be stored either in the memory 14 of the personal computer 10, or in the memory 14 of the remote server computer 50. It will be appreciated that the network connections shown are exemplary and other means of establishing communications between the computers may be used.

As will be described relative to FIG. 2 below, the remote server computer 50 requires that a web server 68 and certain database applications be present on its system drives in order to fulfill the server role in a distributed computing environment. Likewise, the personal computer 10, must include a web browser 60 application among its application programs 36 in order to receive desired information from the remote server computer 50.

The basic problem posed in providing the graphical user interface in the present invention can be solved in either a static or dynamic fashion. In the static approach, all displayable database elements would be pre-formatted into a very large number of individual HTML files. This approach would consume a huge amount of storage space and would be highly tedious to update with new information. In the dynamic approach, the individual HTML files are generated in real-time employing a database of current information for the map region in question. The first embodiment of the present invention is data driven and follows the dynamic approach. It is highly dependent upon the efficient storage and rapid retrieval of large amounts of road and business listing data. This data is organized into a series of tables in a relational database.

The presently preferred embodiment of the database 38 was developed using Microsoft ACCESS (trademark of Microsoft, Corp., Redmond, Wash.) running on a Microsoft WINDOWS (trademark of Microsoft, Corp., Redmond, Wash.) platform. A relational database allows for complete functionality with desktop integration under the Microsoft WINDOWS environment.

The presently preferred way to access the database 38 through the Internet or intranet 64 is with the use of an application server available commercially under the trademark COLDFUSION (trademark of Macromedia Inc., San Francisco, Calif.). The COLDFUSION server 72 version 5.0 runs as a service under the WINDOWS operating system.

Figure 2:
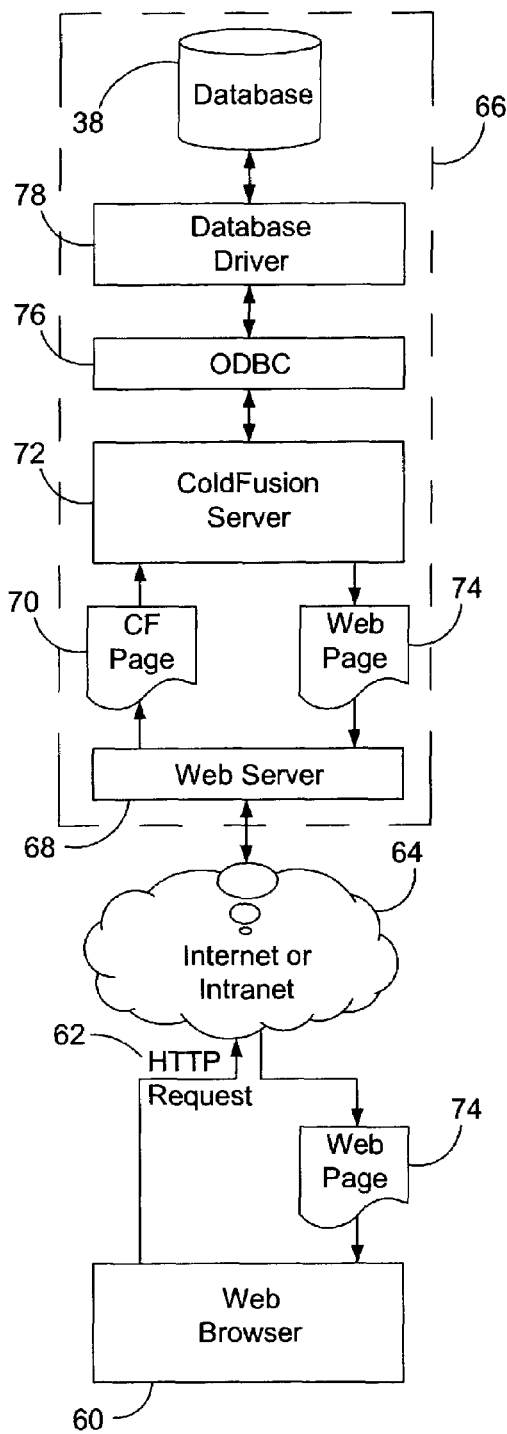
FIG. 2 is a diagram showing the interaction of the software components for a first embodiment of the present invention.

FIG. 2 illustrates the various software components, applications, and steps involved in dynamically displaying a graphical user interface with a linear map component. Elements at the top of FIG. 2 within the border designated by reference numeral 66 are associated with the remote server computer 50. The web browser 60 is one of the application programs 36 employed by the personal computer 10. When a user selects a link on a web page, the web browser 60 sends an HTTP request 62 to a web server 68 via the Internet or intranet 64. If the requested page is a COLDFUSION page 70 (indicated by the .cfm extension), the web server 68 relays the unparsed document to the COLDFUSION server 72. The COLDFUSION server 72 then parses the document containing COLDFUSION Markup Language (CFML) and HTML code to generate an output web page 74 in standard HTML form. CFML scripting tags are used to create and modify variables and to provide program flow control. During the parsing process, the COLDFUSION server 72 communicates with the database 38 in order to populate the resulting HTML web page 74 with desired data elements.

The communication between the COLDFUSION server 72 and the database 38 takes place via a database interface called Open Database Connectivity 76 (ODBC), which is generally known in the art. ODBC 76 provides a standardized interface between applications and databases from many different manufacturers. The language employed when accessing ODBC compliant databases from COLDFUSION is ANSI Structured Query Language '92 (SQL). A database driver 78 is employed to process the SQL formatted request received via ODBC 76 and to translate this request into the native database format. The desired data subset is then routed from the database 38 back to the COLDFUSION server 72 where it is used in generating the resulting HTML web page 74. The web page 74 is then sent by the web server 68 via the Internet or intranet 64 to the client web browser 60 where it is displayed. This dynamic process is hidden from the end user.

Figure 3:
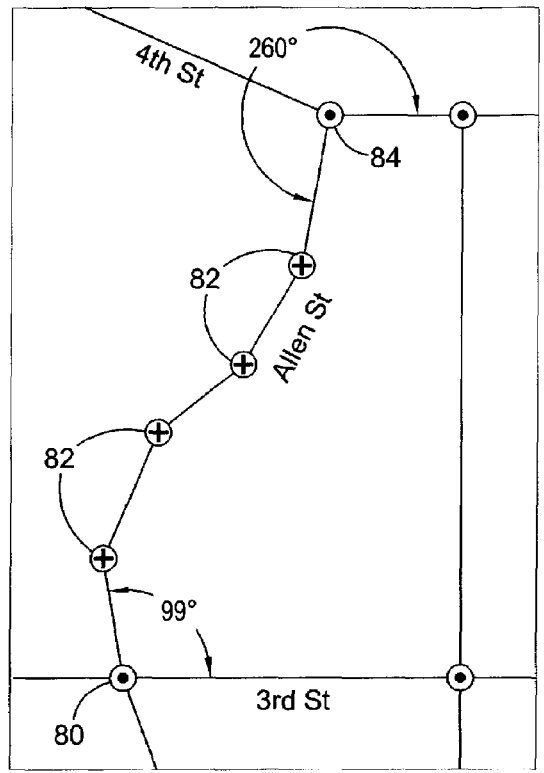
FIG. 3 is a diagram showing the typical road segment data configuration of the original TIGER/LINE map data source for a first embodiment of the present invention.

A chosen data source for the first embodiment is the 1999 Topologically Integrated Geographic Encoding and Referencing system (TIGER/LINE) map files developed by the United States Bureau of the Census. Both "TIGER" and "TIGER/LINE" are trademarks of the U.S. Bureau of the Census, Washington, D.C. Relevant portions of these files have been extracted and reformatted in the database 38 of the present invention. The TIGER/LINE files comprise a digital geographic database with coverage of all roads in the United States. Spatial objects such as lines, points, and polygons are employed to describe roads, intersections, and area features including lakes and parks. The database 38 in the first embodiment of the present invention is comprised of transportation segments that are representative of roads, railroads, and rivers, but the term "transportation segments" will be defined here more generally as segments which form linkages between end nodes, along which, an entity can be transported. As illustrated in FIG. 3, a road segment (or "complete chain" in TIGER/LINE terminology) such as Allen Street, is represented by a start node 80, an end node 84, and a series of intermediate shape points 82 (depicted with plus signs). The segment or complete chain for 3rd Street in FIG. 3 has only a start node and end node. No intermediate shape points exist for this segment since it represents a straight road. Although the 1999 TIGER/LINE files were employed in this case, those skilled in the art will appreciate that other data sources representative of transportation segments could have been used in the first embodiment without altering the scope of the present invention.

Several sources were employed for the business related data. The primary sources were publicly accessible government agencies that provide business information relating to those businesses that are licensed to conduct business within the jurisdiction of the governing entity.

Figure 4:
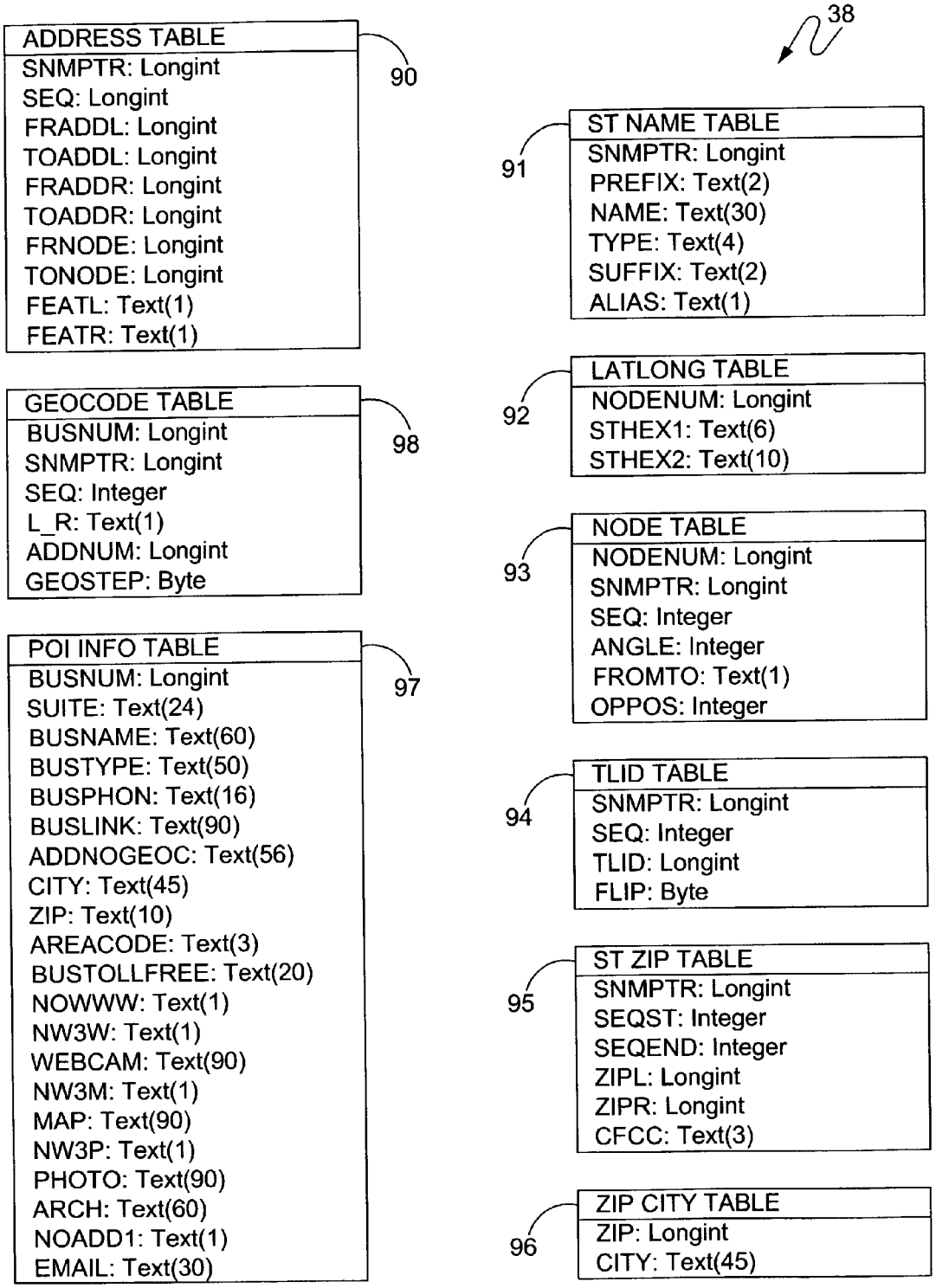
FIG. 4 is a data structure diagram for a first embodiment of the present invention.

The database 38 in the first embodiment comprises data related to roads and business POIs occurring within the chosen city or region. As shown in FIG. 4, the database 38 comprises 9 tables (reference numerals 90 through 98).

The ADDRESS Table 90 comprises 10 fields. Individual transportation segments are represented by a unique street name pointer value (in the SNMPTR field) and sequence number (in the SEQ field). For example, there may be 20 individual segments of West First Street. These would be represented by sequence numbers 1 through 20. Each transportation segment has a "FROM" node (FRNODE) and a "TO" node (TONODE). The ADDRESS Table 90 is organized so that address ranges increase when traversing from the "FROM" node to the "TO" node. A unique address range value occurs on the left and right side of the road at each of the "FROM" and "TO" nodes. A city block might, for example, have an address range of 1 to 99 on the right side of the road, and 2 to 98 on the left side. These address range values are represented in the FRADDL (from address left), TOADDL (to address left), FRADDR (from address right), and TOADDR (to address right) fields. The left side of a transportation segment is that side which would appear to be on the left if you were to stand at the "FROM" node and look toward the "TO" node. The FEATL and FEATR fields are used to designate features such as parks. If the letter "P" appears in the FEATL or FEATR field for a specific segment, this means that a park exists along that side of the transportation segment. To see examples of how such parks are represented in the linear format refer to FIGS. 6A and 8.

The ST NAME Table 91 comprises 6 fields relating to transportation segment names. The SNMPTR field contains a unique long integer designation for every street name that occurs in the database 38. An example of a street name in this case would be "N 24th St W" where "N" is the PREFIX, "24th" is the NAME, "St" is the type, and "W" is the SUFFIX. In some cases one street may be referred to by more than one name. For these cases, additional records are added to the ST NAME Table 91 for each alias and the ALIAS field for these additional records is set to "1".

The LATLONG Table 92 comprises a representation of the latitude and longitude for every unique node in the database. The NODENUM field contains a long integer designating each unique node. The STHEX1 and STHEX2 fields contain values representing the latitude and longitude associated with each node. The database 38 includes node values for the end nodes of each segment.

The NODE Table 93 comprises 6 fields relating to road "nodes" or intersection points. The NODENUM field contains a unique long integer designation for every unique node that occurs in the database. Nodes can also be related to individual transportation segments via the SNMPTR and SEQ fields. The FROMTO field is used to determine if the node occurs at the "FROM" or the "TO" end of the transportation segment. An "F" value designates a "FROM" node and a "T" value designates a "TO" node. The ANGLE field represents the angle that the road takes where it meets the node. This value is measured from 0 to 360 degrees (in counter-clockwise fashion starting from zero degrees for due east). In the case of curving transportation segments (those TIGER/LINE file complete chains with intermediate shape points) the angle is calculated as the angle to the line formed between the node and its nearest adjoining shape point. As illustrated in FIG. 3, the angle of Allen Street at its start node 80 is 99 degrees. The angle of Allen Street at its end node 84 is 260 degrees. As will be described later in this document, these ANGLE values are used when attempting to determine which segment, if any, is the continuation of the current segment in the projected path of travel. The OPPOS field is used to designate one of the intersecting transportation segments as the opposite or main continuation segment when this can't be determined by simply analyzing the angles of the intersecting transportation segments.

In the original TIGER/LINE format, every individual transportation segment is given a TIGER/LINE Identification Number (TLID). This number is retained in the TLID field of the TLID Table 94. The FLIP field in this table relates whether or not the "FROM" and "TO" fields were flipped. In those cases when the source TIGER data had address ranges descending from the "FROM" to the "TO" nodes, the "FROM" and "TO" designations were flipped so that the address ranges would be ascending.

The ST ZIP Table 95 relates zip codes to individual transportation segments. In some cases, one zip code will occur along the entire length of a multi-segment road. Say, for example, that West Center Street has 40 segments, all of which share the same "55555" zip code. In this case, the SEQST (sequence start) value will be "1", the SEQEND (sequence end) value will be "40", and the ZIPL (Zip code on the left side of the street) and ZIPR (Zip code on the right side of the street) values will both be "55555". But if the Zip code were to change midway down the street to "55556", then two records in the ST ZIP Table 95 would be required. The first record would have an SEQST value of 1, an SEQEND value of 20, and ZIPL and ZIPR values of "55555". The second record would have an SEQST value of 21, an SEQEND value of 40, and ZIPL and ZIPR values of "55556". Note also that it is possible to have different zip code values on the left and right sides of a road. For this reason both the ZIPL and ZIPR fields are included. The CFCC field is a TIGER/LINE file field that designates the feature type. Different CFCC values are used to represent roadways, walkways, railroads, waterways, and various other features.

The ZIP CITY Table 96 relates city names to zip codes. For example, a value of "10001" in the ZIP field, would have a related value of "Manhattan" in the CITY field.

The POI INFO Table 97 provides additional information related to individual POIs in the database 38 including suite number, phone numbers, zip code, email addresses, and web links. The BUSNUM field contains a unique long integer designation for every business related POI that occurs in the database. Individual fields are also provided for the suite designation (SUITE), the POI designator (in this case BUSNAME for business name), the business type (BUSTYPE), the business phone number (AREACODE and BUSPHON), a toll-free phone number (BUSTOLLFREE), the city in which the business occurs (CITY), zip code (ZIP), and E-mail address (EMAIL). The ARCH field is intended to hold the name of the architect responsible for designing the building in which the business is housed. Primary POI links for those POIs with associated web sites, are designated in the BUSLINK field. BUSLINK values are specified without the "http://www" prefix found in most Internet addresses. This prefix is automatically added to the BUSLINK value except in the case when the NOWWW field value is "1", in which case the "www" part of the address is omitted. Additional POI links can be specified for associated web cameras (the WEBCAM field), maps (the MAP field), and photographs (the PHOTO field). These Internet addresses can also exclude the "www" portion of their addresses by specifying a value of "1" in their associated NW3W, NW3M, and NW3P fields respectively. In some cases, a business may give an address in a form that will be understood by all but that will not be in a typical street address format. For example, several businesses in Manhattan specify their addresses as "Grand Central Terminal" rather than 107 E 42nd Street. For these businesses, the "Grand Central Terminal" designation is given in the ADDNOGEOC field. A non-null value in the NOADD1 field means that the ADDNOGEOC value ("Grand Central Terminal" in this case) should be displayed as the business address instead of the typically formatted street address ("107 E 42nd St").

The GEOCODE Table 98 provides a connection between individual POI entities and individual transportation segments. The BUSNUM field contains a unique long integer designation for every business POI that occurs in the database. The SNMPTR and SEQ fields relate the individual transportation segment on which the POI is found. The L_R field is set to "L" if the business occurs on the left side of the road and to "R" if the business occurs on the right side (when traversing from the "FROM" node to the "TO" node). THE ADDNUM field contains the actual address number for the business. For example, a business located at 124 East Main Street has an ADDNUM value of "124". The GEOSTEP field is a factor with very large buildings that, in some cases, cover entire city blocks. These buildings may be accessible from more than one street. They may be associated with more than one address. If a building is associated with three different street addresses (or if it can be accessed from three different streets), it will have three records in the GEO-CODE Table 98 with three different values in the GEOSTEP field, but only one associated record in the POI INFO Table 97.

Figure 5:
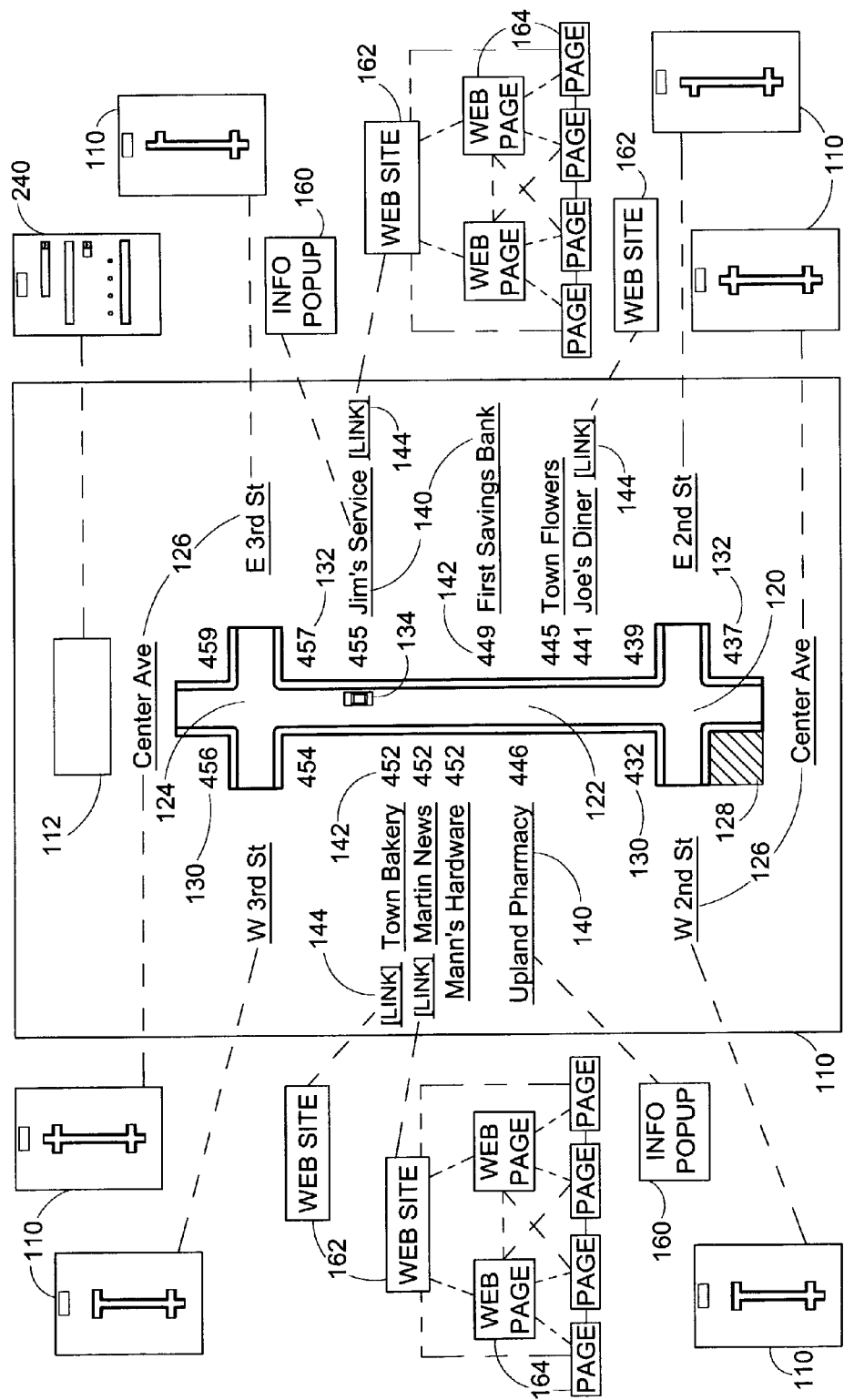
FIG. 5 is a schematic diagram of the graphical user interface for a first embodiment of the present invention.
Figure 7:
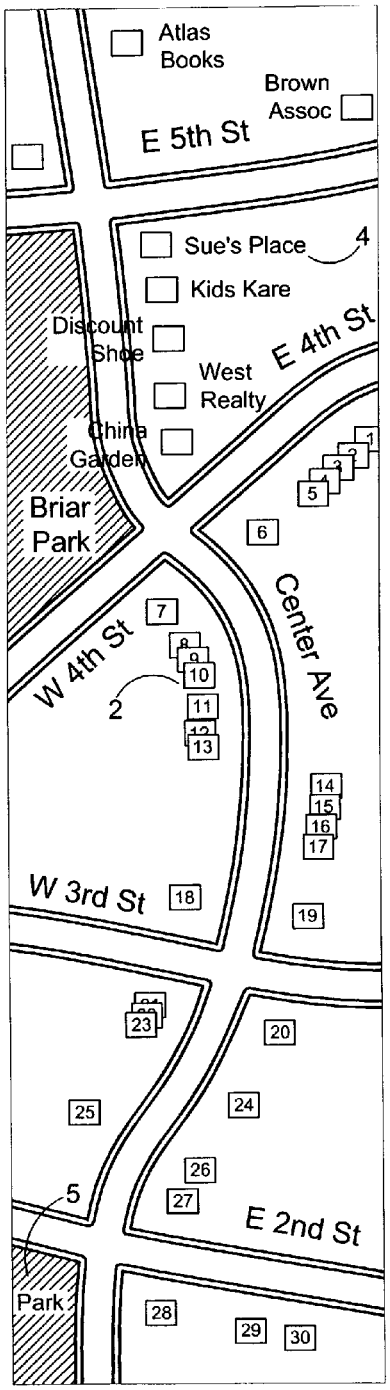
FIG. 7 illustrates prior art techniques for depicting POI designators on a map.
Figure 8:
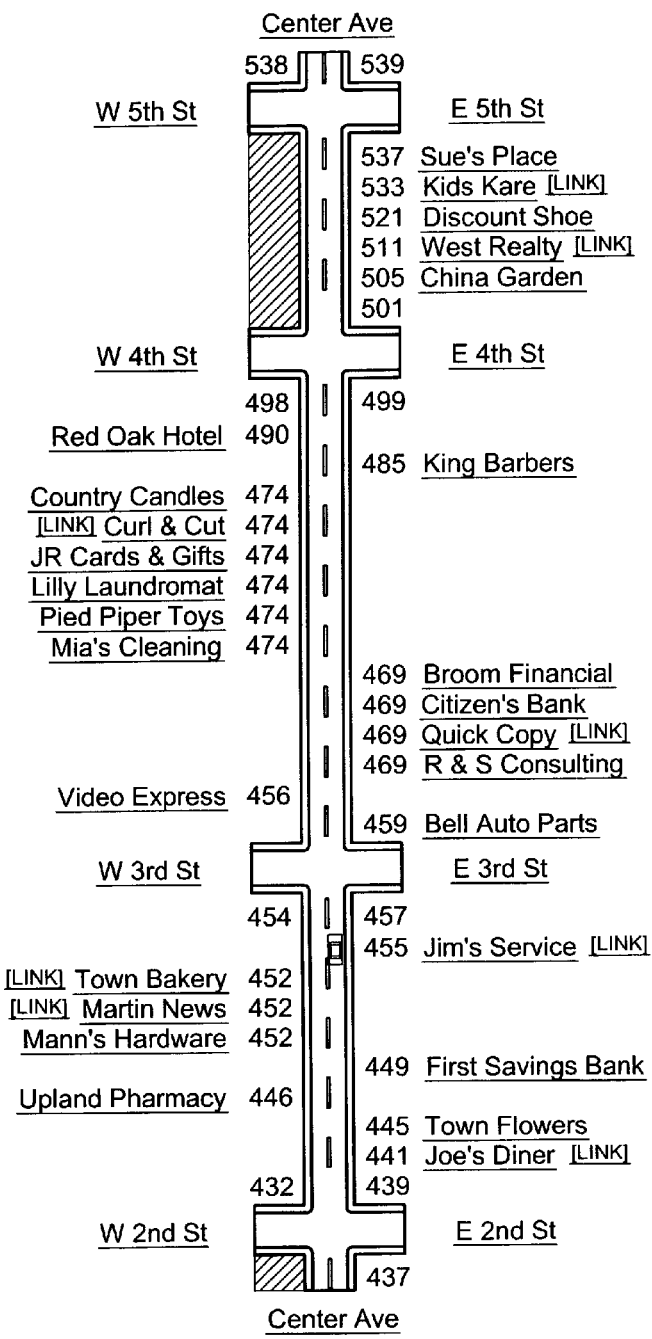
FIG. 8 is an illustration of the graphical user interface for a first embodiment of the present invention that depicts in a linear format the geographical area shown in the prior art FIG. 7.
Figure 9:
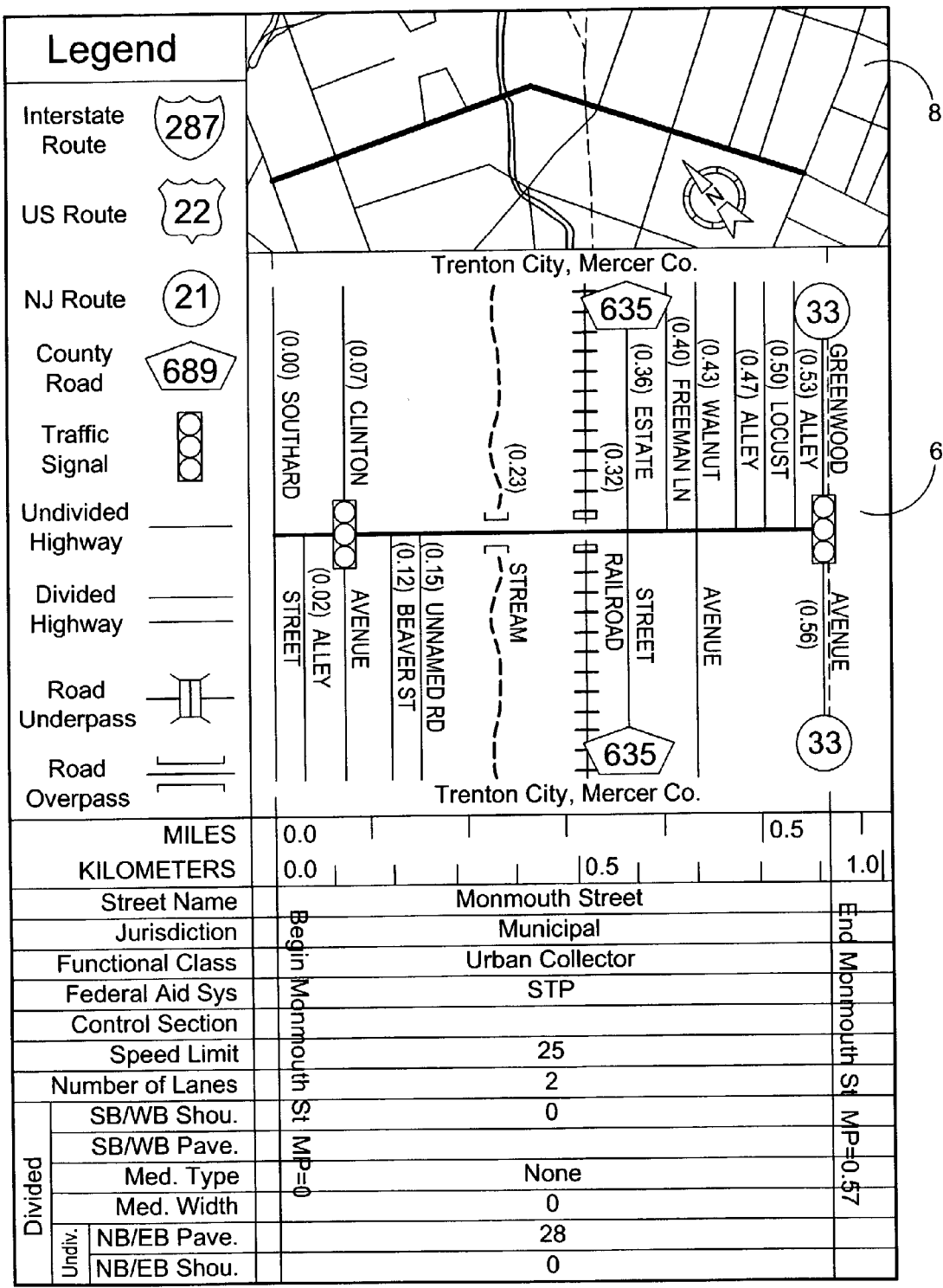
FIG. 9 is a prior art illustration of a straight-line diagram generated by the New Jersey Department of Transportation.

The first embodiment of the present invention includes a graphical user interface (GUI) that organizes data into a consistent presentation of geographically organized information. FIG. 5 is a schematic diagram illustrating the linear format and the functionality of the main GUI screen 110. For illustrative purposes, only one complete projected path of travel segment 122, with associated intersection nodes at either end, has been depicted. The actual number of complete transportation segments depicted in the main GUI screen 110 is user configurable, and will, if large enough, require that the user scroll up and down the screen in order to view the generated data in its entirety. An example depicting three complete projected path of travel segments is shown in FIG. 8. By comparing FIG. 8 with the prior art FIG. 7 it is possible to see the results of the formatting step by which the curving roads and overlapping business icons of FIG. 7 are formatted into the cleanly organized and easily comprehended linear format of FIG. 8. Generally speaking, the linear format depicts the transportation segments along a projected path of travel as straight segments that have been aligned in a collinear fashion. As a result of this formatting process, textual data associated with POIs along the transportation segments, is easily accommodated in the formatted output.

In the case of FIG. 8, a predetermined route has not been shown. The path of travel is projected, and thus we see a series of three contiguous similarly oriented complete segments of Center Avenue. In the case of a predetermined route, the setting relating to the number of complete transportation segments depicted can be configured such that only those complete transportation segments being traversed along the predetermined route are shown. A user specified setting, in this case, would set a maximum number of segments shown. For example, if the predetermined route includes a turn onto First Avenue, followed by an immediate subsequent 90-degree turn onto some other street, then only one complete segment of First Avenue would be shown even if this results in fewer complete segments than specified in the maximum setting. If the setting is not configured to show only those complete segments being traversed by the predetermined route, then the projected path of travel with the specified number of depicted segments will be shown underneath the arrow depicting the predetermined route, even if, as in the above example, the predetermined route changes course before traversing all of the complete segments in the projected path of travel shown.

The main GUI screen 110 in FIG. 5 serves as the main interface through which various data relating to specific locations or paths of travel can be accessed. User selectable items (including textual links and graphical icons) in the main GUI screen 110, can be selected by positioning a mouse cursor above the item, and clicking the appropriate mouse button. At the top of the screen is a search link 112, which when selected, initiates the display of the "main search" screen 240. Intersections are shown at the each end of the depicted complete transportation segment. The bottom intersection node 120 is at the bottom of the road. The complete projected path of travel segment 122 connects the bottom intersection node 120 to the top intersection node 124. In this particular instance, the bottom intersection node 120 can be said to be a "FROM" node, and the top intersection node 124, a "TO" node. The "FROM" and "TO" node designations imply that address ranges will be ascending when traveling from the "FROM" node to the "TO" node. Appearing adjacent to each partially depicted transportation segment is a transportation segment name 126, which also serves as a transportation segment link to initiate the display of a new main GUI screen 110 of an associated subset of data. As an alternative, a separate designator (such as a small arrow at the end of the partially depicted road) could be provided for the transportation segment link. Although each of the new main GUI screens 110 in FIG. 5 are designated by the same reference numeral, it should be understood that each screen, while employing the same linear format and functionality, will be different in that each main GUI screen 110 comprises an associated subset of data related to the various individual transportation segment links. Note that there is a hatched area representing a park 128 at the corner of Center Avenue and West 2nd Street in FIG. 5. For an additional example, compare the park 5 in the prior art FIG. 7 with its representation in FIG. 8. The bottom intersection node 120 of the complete projected path of travel segment 122 has a "FROM" node left address range 130 with a value of "432". The top intersection node 124 for this same projected path of travel segment 122 has a "TO" node right address range 132 with a value of "457". The top intersection node 124 of the complete projected path of travel segment 122 will become the bottom intersection node (and the "FROM" node) for the complete segment of Center Avenue occurring immediately above 3rd Street as a continuation of the current complete projected path of travel segment 122. For this reason, the "456" address number appearing on the left side of this segment is referenced as a "FROM" node left address range 130.

An individual POI designator 140 of each POI in the database that is associated with the currently displayed street segment is displayed on that side of the street segment on which it is located. POI address numbers 142 are employed to determine the relative position of each individual POI designator 140 in order to simulate the actual ordering of businesses along the projected path of travel segment 122. Individual POI designators 140 serve as user selectable links to additional POI information in an info popup 160 associated with a particular POI. The "popup" in this case can take the form of a small window that pops up over the POI designator 140 in question in the currently displayed screen, or can take the form of an entirely new page. Each info popup 160 contains additional information related to the associated POI such as complete address, phone numbers, and zip code if such information exists in the database 38. POI links 144 will be displayed next to the individual POI designators 140 for those POIs that have associated Internet addresses (or pointers to remotely or locally stored hyperlinked documents) in the database 38. In the first embodiment, POI links 144 comprise the word "LINK" enclosed in square brackets. Once activated, by selecting with a mouse or input device, POI links 144 initiate the display of additional POI information in the form of an associated web site 162 or other associated document. In some cases, a web site 162 will itself contain links to additional web site pages 164.

Also shown in FIG. 5 is a user position icon (UPI) 134 which represents the user's location relative to the depicted transportation segments. The user's location in this case is that which matches with the address string specified by the user in the main search screen. In a variation of the automobile UPI 134 shown in FIG. 5, an icon (not shown) depicting the location of a person walking could be employed to depict a mobile user on foot.

Figure 6A:
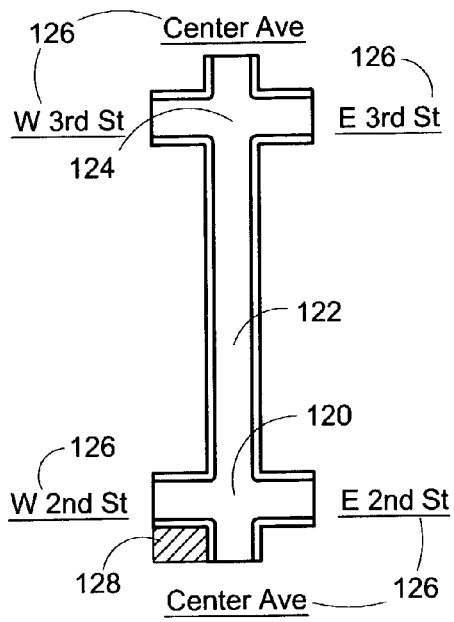
FIGS. 6A through 6D are diagrams illustrating the various levels of information that can be depicted in the main screen of the graphical user interface of FIG. 5 for a first embodiment of the present invention.
Figure 6B:
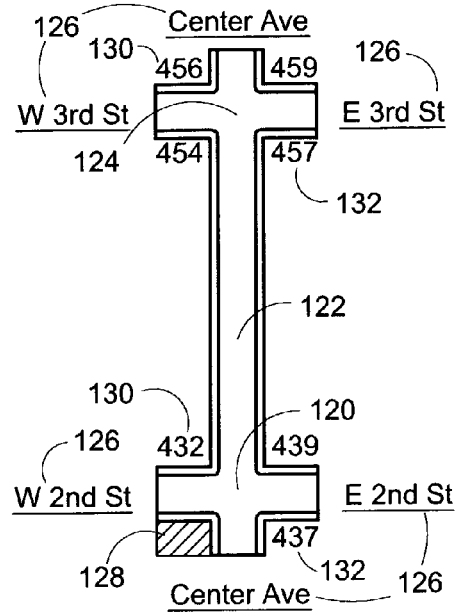

Although the main GUI screen 110 in FIG. 5 depicts data of various types, including transportation segment names 126 (which also serve as transportation segment links), POI designators 140, and POI address numbers 142, this screen can also be configured to display a subset of these data types. As shown in FIGS. 6A and 6B, the linear formatted representation of the projected path of travel segment 122 forms a connection between its associated bottom intersection node 120 and top intersection node 124. FIGS. 6A and 6B also incorporate the transportation segment names 126 (which once again also function as transportation segment links) and hatched area representing a park 128. FIG. 6B further includes "FROM" node left address ranges 130 and "TO" node right address ranges 132. The option of permitting the display of a subset of these data types enables users to configure the interface to display only the data required by them, and increases the usability of the interface on devices with limited bandwidth and limited screen display areas.

Figure 6C:
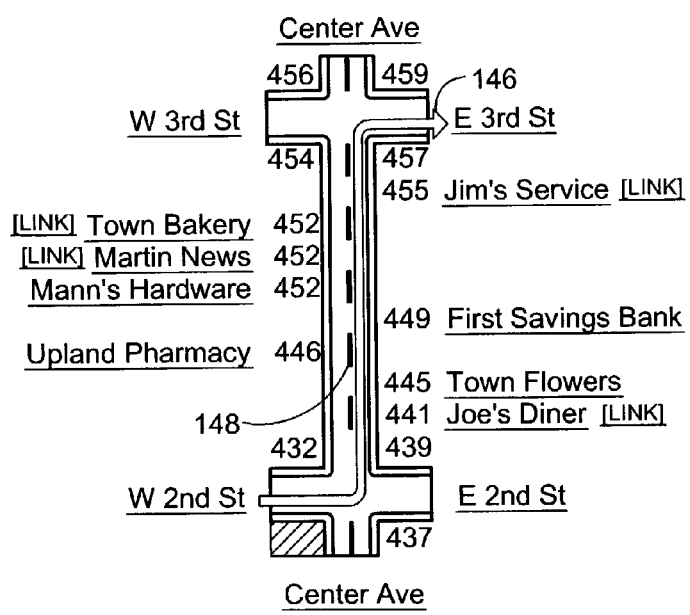
Figure 6D:
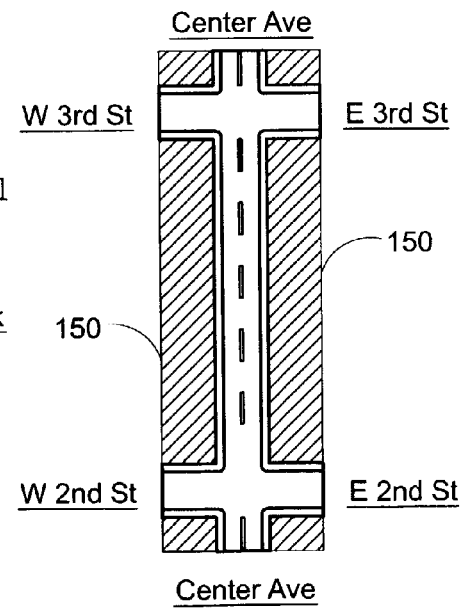

FIG. 6C shows how a predetermined route graphic 146 would be superimposed over a screen identical to the main GUI screen 110 of FIG. 5. Predetermined routes would exist in the case of routing applications when a destination location has been specified. Example systems that would generate predetermined routes include online routing systems and in car navigation systems. A distinction should be made between a predetermined route and a projected path of travel. The implication in a projected path of travel is that the user will continue to travel along the currently traveled road or in the general direction in which he or she is heading. projected path of travel segments are the linear formatted vertically oriented segments including complete segments and partially depicted segments that occur in some cases at each end of the projected path of travel (when the projected path of travel continues above and below the segments depicted). Other intersecting segments that are not in the projected path of travel (depicted in the first embodiment intersecting at perpendicular angles to the complete transportation segments) are only partially depicted. Predetermined route segments are those linear formatted complete transportation segments, or intersecting partially depicted segments that are traversed in the predetermined route. FIG. 6C also shows a yellow center stripe 148 incorporated into the representation of the road. Finally, FIG. 6D shows how representations of demographic data 150 are incorporated into the linear format.

As illustrated in FIG. 10, the main GUI screen 110 can be generated as an HTML table. The advantage of this approach is that the vast majority of all web browsers can display HTML tables. No third party add-on software components are necessary. Tables of this type also handle textual data well.

A unique aspect of the use of HTML tables in the first embodiment of the present invention is that individual table cells are rendered as colored regions that together form a graphical representation of a road. The table depicted in this instance has 11 columns. The vertically oriented road representing the projected path of travel is rendered in the 5 columns at the center of the table. The centermost column depicts the dashed yellow center stripe. The dash in this case is accomplished by turning the yellow stripe on or off for each successive row in the table (with the exception of rows representing intersecting roads). The columns to either side of the center stripe column would be given a dark gray background color (to represent the asphalt of the road). The columns adjacent to the centered three-column road depiction would be given a light gray background color (to represent sidewalks), except in the case when an intersecting road occupies a row in the table (in which case the 7 centermost cells are all given the dark gray background color).

In order for the chosen background color to be displayed, some web browsers require that the table cells in question contain text. The background color will not be rendered if no text is present. To resolve this issue, a single period is placed as text within all road depiction cells that are given colored backgrounds. The color specified for the single period is identical to that given for the background so that these textual elements will not be visible in the final rendered table. The only instance when the text element is not required is if an image file is inserted in the table cell. This happens in the first embodiment at the corners of sidewalks as shown in FIG. 10 and Table 1. A partial listing of the code for the HTML table depicted in FIG. 10 can be found in Table 1. The HTML code representing some rows has been omitted in order to reduce the length of the code listing.

A variation of the main screen of the GUI is illustrated in FIG. 11A. This variation is built into the first embodiment of the present invention and employs Wireless Markup Language (WML) tables rather than HTML tables. WML is the markup language used by many small and portable computing devices such as cellular phones, PDAs, and handheld computers. Tables in WML do not have the wide range of available features found in HTML tables, but are well suited to portable devices with their lower bandwidth capabilities. The bandwidth issue results in a stripped down version of the GUI as depicted in FIG. 11A. Roads are still rendered in a linear format, but the representation is simplified compared to the HTML version. As shown in FIG. 11A, roads are represented by a series of small Graphics Interchange Format (GIF) files. The intersection GIF image 166 appears at each end node of each depicted road. Variations of this image file are employed when there are more or fewer intersecting transportation segments at the chosen intersection. Two or more road section GIF images 168 appear in between the two intersection GIF images 166 (depending on whether or not associated POI data is displayed). Transportation segment names 126, which in this case also serve as transportation segment links, enable the user to move from the depiction of one transportation segment to another by selecting a transportation segment link to initialize a new main GUI screen 110. The address numbers, as shown in FIG. 11A, are diminishing as one travels vertically up the road from 3rd Avenue to 2nd Avenue. This means that the "FROM" node is at the top of the transportation segment, and the "TO" node is at the bottom (since address ranges must increase from the "FROM" node to the "TO" node). The "FROM" node left address range 130 for this segment of East 49th Street has a value of "200". The "TO" node right address range 132 for this segment has a value of "299". The search link 112 brings up the "main search" screen 240 so that the user might specify a new location for which a new main GUI screen 110 is desired.

FIG. 11B shows the outline of the rows and columns that make up the linear formatted WML table. Note in this case that the table is only 3 columns wide due to the simplifications employed in representing the road. Table 2 contains the WML code for the table depicted in FIG. 11B.

Although only the HTML and WML table formats have been described in detail above, those skilled in the art will recognize that the format employed could also be SGML, XML, DHTML, or XHTML, and that the use of such an alternative markup language would not alter the spirit and scope of the present invention.

The overall method flowchart 170 in FIG. 12 depicts the major steps in the method to provide a graphical user interface with a linear map component in the first embodiment of the present invention. The first step in the method is to "store the database comprising transportation segments" 180. In this step, the database 38 is loaded onto a memory 14 such as the hard disk drive 27 of the remote server computer 50 (although other memory devices could also be employed to store the database 38). The next major step, explained in detail below, is to "retrieve and format the data subset into a linear format" 300. The final major step in the method is to "display the data subset in linear format" 390. After the data subset is formatted, the web page 74 which includes the resulting linear format, is sent by the web server 68 of the remote server computer 50 via the Internet or intranet 64 to the controller means 12 of the personal computer 10 which then relays the file via the system bus 23 to the client web browser 60 which interprets and causes the display of the file on the display means 16 of the personal computer 10.

Figure 13:
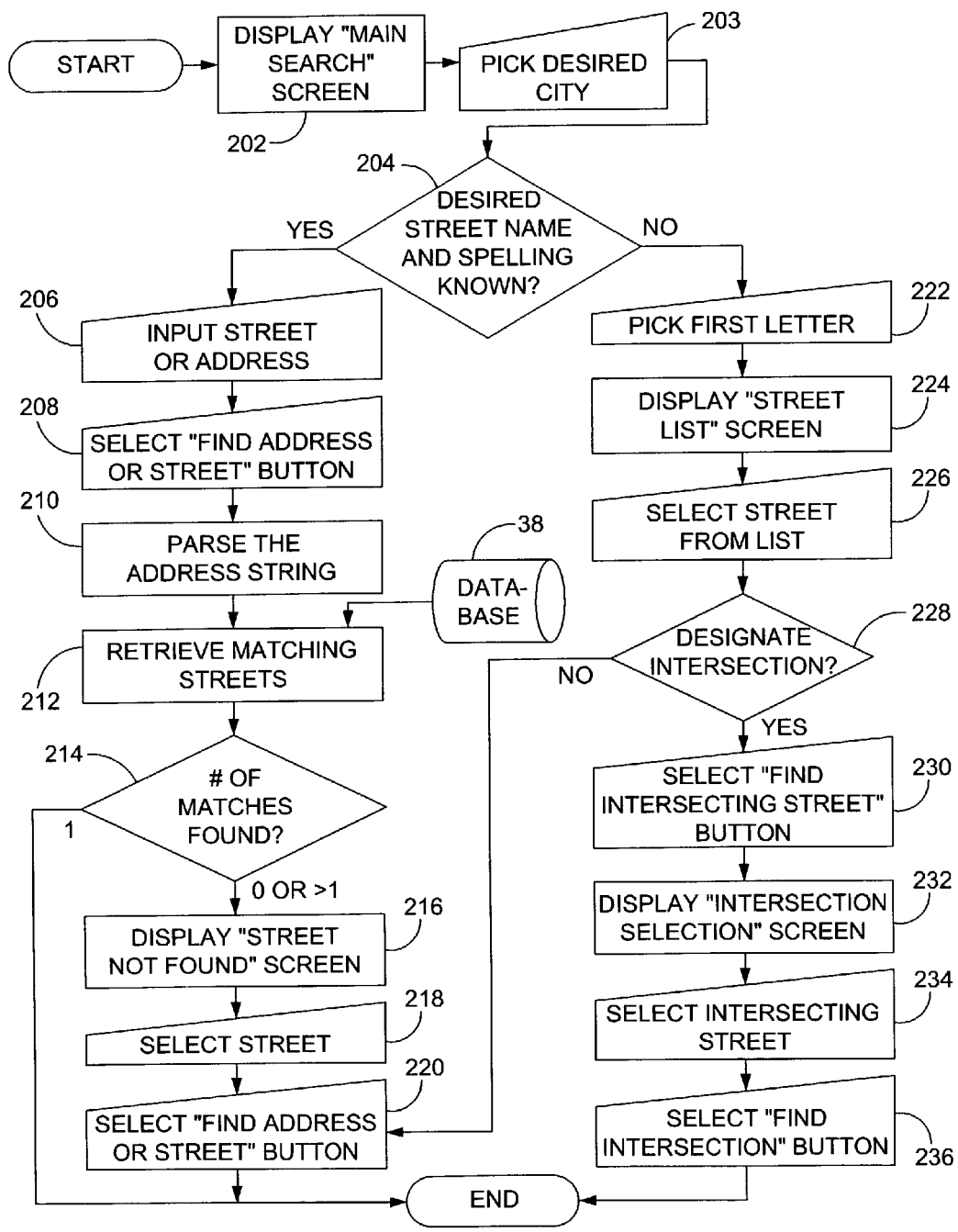
FIG. 13 is a flow chart of a Location Determination Process for a first embodiment of the present invention.

The flowchart in FIG. 13 relates the steps involved in determining a location. A location must be determined prior to retrieving and formatting any data. On mobile systems such as in car navigation systems, this step can be automated through the use of a location determining device such as a GPS receiver 47 or a cellular telephone network. The first embodiment employs a manual approach more suited to an online location based search engine. The flowchart in FIG. 13 makes reference to the search screen images depicted in FIGS. 14 through 17. These figures will therefore be described prior to addressing FIG. 13.

Figure 14:
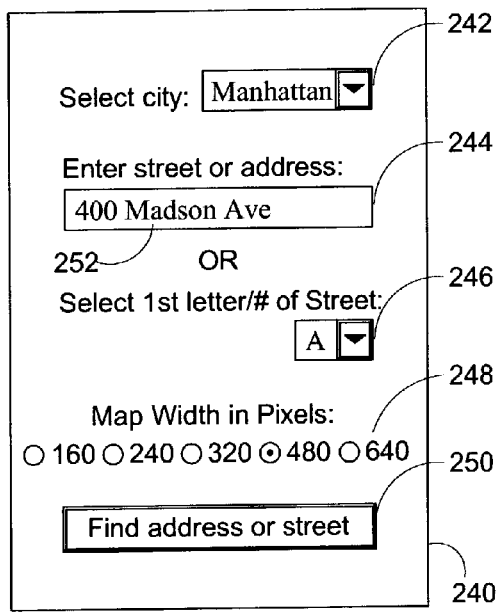
FIG. 14 illustrates the "Main Search" screen for a first embodiment of the present invention.

The "main search" screen 240, shown in FIG. 14, provides the user with a manual way of specifying a location, about which, data is desired. The "main search" screen 240 contains a city drop down list 242, an address entry box 244, a first character drop down list 246, a group of map width radio buttons 248, and a "Find address or street" button 250. The city drop down list 242 enables the user to select a desired city from a list of available cities. If the user wishes to see data relating to a known street or address, an address string 252 can be input in the address entry box 244. After specifying a city in the city drop down list 242 and entering an address string 252 in the address entry box 244, the user must click on the "Find address or street" button 250 in order to initiate the display of a new main GUI screen 110. The map width radio buttons 248 can be employed to change the total width of the generated new main GUI screen 110. This feature is necessary to accommodate the many different screen display resolutions found on various computing devices. The first character drop down list 246 provides an alternative method of specifying a street or intersection. If the user doesn't know the exact name or spelling of the desired street, he can select the first character in the street name from the first character drop down list 246 and, by clicking on the "Find address or street" button 250, initialize the "street list" screen 280, as depicted in FIG. 16.

Figure 15:
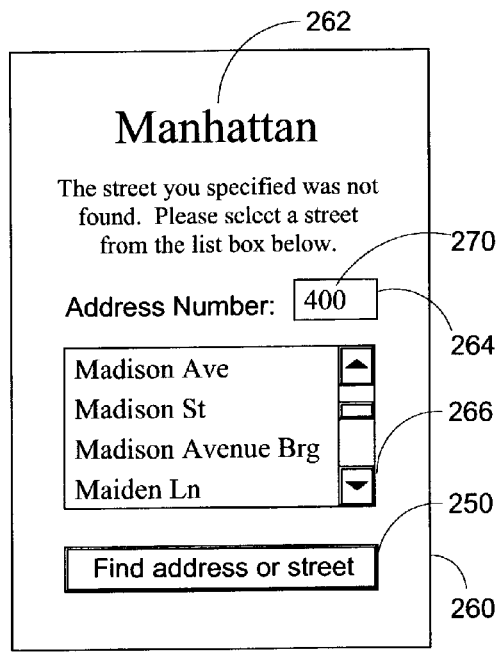
FIG. 15 illustrates the "Street Not Found" screen for a first embodiment of the present invention.

If a match for the address string 252 can't be found in the database 38 associated with the city specified in the city drop down list 242, the "street not found" screen 260, as shown in FIG. 15, will be displayed. The "street not found" screen 260 contains a text string relating the currently specified city 262, an address number entry box 264, a street selection list 266, and a "Find address or street" button 250. Each address string 252 that includes a street address number is parsed into a parsed address number 270 and a street name. The street selection list 266 includes all streets in the currently specified city beginning with the first character of the user specified non-matching street name. The value in the address number entry box 264 is initialized to the parsed address number 270, if such a number exists in the address string 252. If the user desires, he or she can modify the parsed address number 270 in the address number entry box 264. Once the user has selected a street from the street selection list 266, and clicked on the "Find address or street" button 250, the location determination process is complete.

Figure 16:
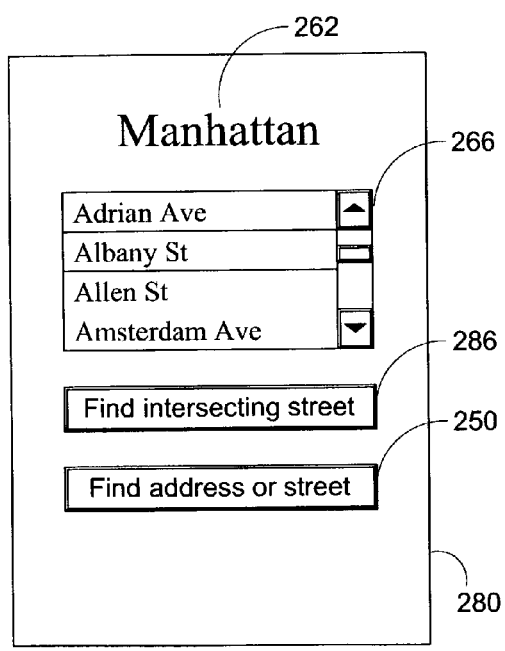
FIG. 16 illustrates the "Street List" screen for a first embodiment of the present invention.
Figure 17:
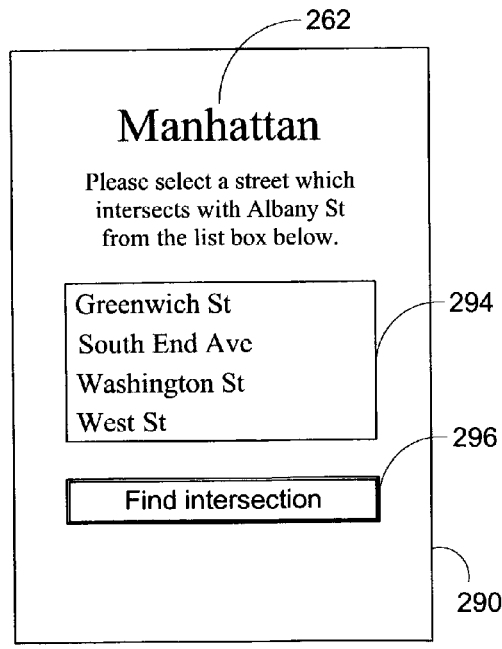
FIG. 17 illustrates the "Intersection Selection" screen for a first embodiment of the present invention.

The "street list" screen 280, shown in FIG. 16, contains a text string relating the currently specified city 262, a street selection list 266, a "Find intersecting street" button 286, and a "Find address or street" button 250. The "street list" screen 280 is displayed when a user follows the alternative method of specifying a street or intersection in the "main search" screen 240 by selecting a number or character from the first character drop down list 246. The street selection list 266 contains a list of all streets in the currently specified database 38 beginning with the chosen first character. After clicking on a street in the street selection list 266, the user must select one of the two buttons at the bottom of the screen to initiate further action. To begin the process of displaying a new main GUI screen 110 for the chosen street, the user can select the "Find address or street" button 250. Selecting the "Find intersecting street" button 286 will initialize the "intersection selection" screen 290 depicted in FIG. 17. The "intersection selection" screen 290 contains a text string relating the currently specified city 262, an intersecting street selection list 294, and a "Find intersection" button 296. Only those streets that intersect with the street chosen from the street selection list 266 of the "street list" screen 280 will be included in the intersecting street selection list 294. If the number of intersecting streets exceeds the size of the intersecting street selection list 294 then an associated scroll bar will be displayed. After selecting a street from the intersecting street selection list 294, the user must click on the "Find intersection" button 296 in order to complete the location determination process.

Referring now back to FIG. 13, we see that the step 202 to display the "main search" screen 240 occurs at the top of the flowchart. Immediately following this step, the user must pick the desired city in step 203 from the city drop down list 242 (or leave the current city as shown). As described above, the "main search" screen 240 permits the user to specify a location by either entering a complete address or just a street name (if the address number is not known), or by picking the first letter or number appearing in the desired street name. The decision block 204 requires that the user determine whether or not the desired street name and spelling are known. If the answer to this question is "yes", step 206 requires that the user input the address string 252 in the address entry box 244. The next user step 208 is to select the "Find address or street" button 250. At this point, the address string 252 is parsed in step 210. This step involves separating the address string 252 into each of its various address string components. As an example, a string such as "250 W King Ave S" would return parsed values of "250" for the parsed address number 270, "W" for the street prefix, "King" for the street name, "Ave" for the street type, and "S" for the street suffix. Once these components are known, an attempt is made in step 212 to retrieve any matching street segments from the database 38. If only one such match is found at decision block 214, the location determination process is complete. If however zero or more than one matches are found, additional steps must be taken beginning with step 216 to display the "street not found" screen 260. If there are no matches with the specified street, the "street not found" screen 260 displays a street selection list 266 that begins with the same first character as the specified street. If more than one match is found, the street selection list 266 displays all matching streets. In either case, the next step 218 is for the user to select a street from the street selection list 266, and finally in step 220 to select the "Find address or street" button 250.

In the event that the user does not know the desired street name or how to spell it, the available option in step 222 is to pick the first letter from the first character drop down list 246. This action will initialize step 224 in which the "street list" screen 280 is displayed. This screen contains the street selection list 266 in which all roads that begin with the designated first character are shown. Step 226 requires that the user select a desired street from the street selection list 266. After doing so, the user must determine in decision block 228 if the location is to be specified as an intersection. If not, the user should select the "Find address or street" button 250 in step 220. If so, the user should select the "Find intersecting street" button 286 in step 230. In the case of the former action, a newly generated main GUI screen 110 will depict the first segment matching with the specified street at the bottom of its projected path of travel. Since the street segments are ordered by address range numbers in the database 38, this first matching segment will normally be the segment with the lowest associated address ranges. The latter action will initiate step 232 to display the "intersection selection" screen 290. This screen includes an intersecting street selection list 294 that is comprised of all streets intersecting with the street previously specified. In step 234 the user selects one of the intersecting streets from the intersecting street selection list 294. The user then selects the "Find intersection" button 296 in step 236 to complete the location determination process.

The general process of retrieving and formatting the data subset into a linear format works from the bottom of the generated screen to the top. When a new main GUI screen 110 is first generated, the location determined in the location determination process occurs within the bottommost complete segment on the screen. If the entire projected path of travel requires more screen space than that available on the display means, then the new main GUI screen 110 will appear initially with its slider positioned at the bottom of the scroll bar so as to display the bottommost portion of the main GUI screen 110. This is accomplished via an anchor placed at the bottom of the HTML page. As the user proceeds forward along his path of travel, he would likewise be proceeding vertically or upward along the roadway depicted in the new main GUI screen 110. The HTML table that contains the formatted data is generated row by row from the bottom to the top.

Figure 18:
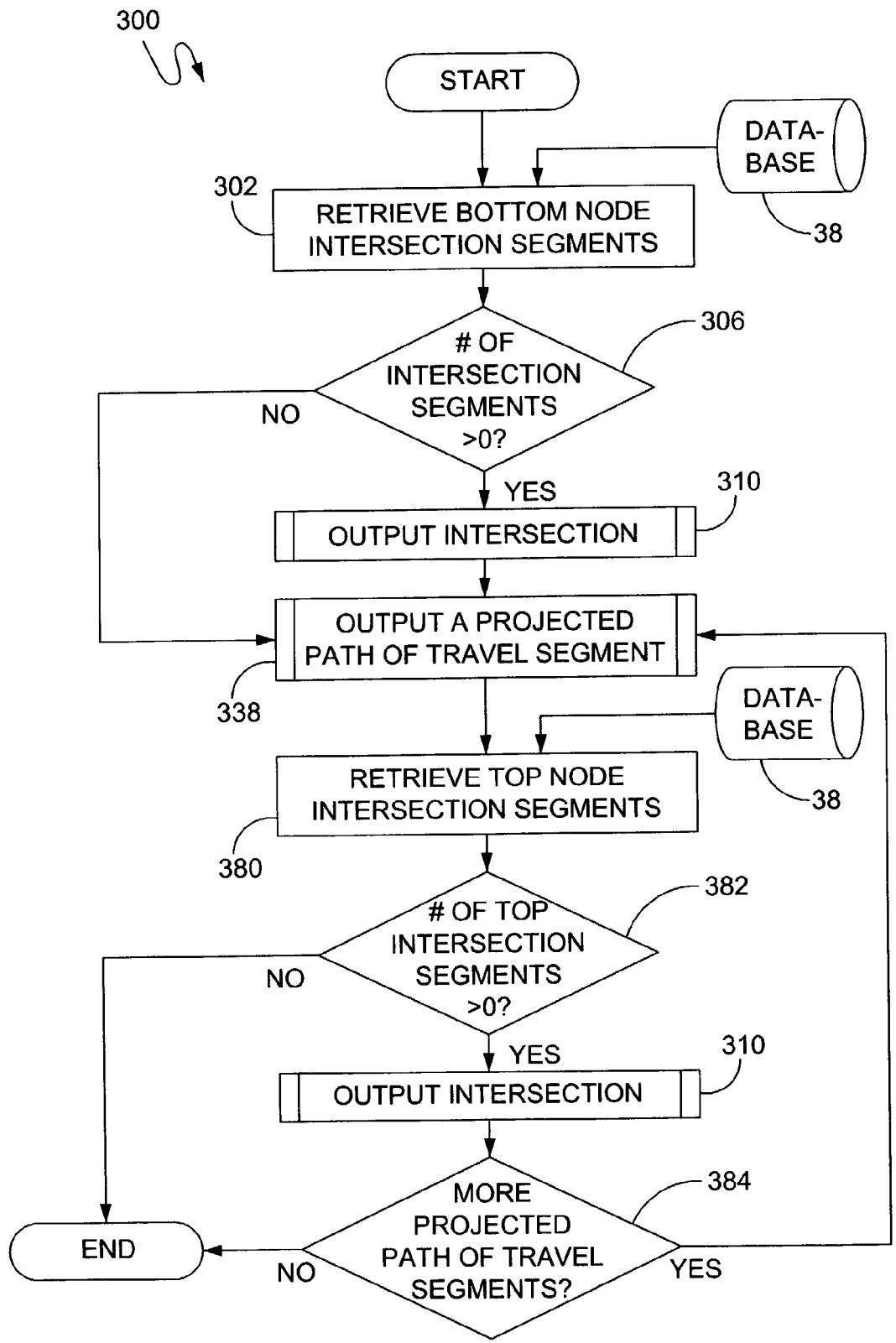
FIG. 18 is a flow chart of the process to retrieve and format a data subset into a linear format as referred to in FIG. 12 for a first embodiment of the present invention.

FIG. 18 relates the steps involved in the process to "retrieve and format a data subset into a linear format" 300. The data subset in this case includes data representing transportation segment names, node intersection segments, address ranges, and POI items. The first step 302 is to retrieve bottom node intersection segments from the database 38. The determination as to whether the bottom node is a "FROM" or "TO" node must be made at the beginning of step 302 by analyzing address range numbers. The next step is the decision block 306 in which it is determined if the number of bottom node intersection segments is greater than zero. If the answer is "yes", the "output intersection" process 310 is initiated. If the answer is "no", this step is bypassed and the "output a projected path of travel segment" process 338 begins. The following step 380 in the process involves retrieving all top node intersection segments from the database 38. If the bottom node had been a "FROM" node, then the top node must be a "TO" node, and vice versa. Once again, the data retrieval step is followed by a decision block 382 in which it is determined if the number of top node intersection segments is greater than zero. If the answer to this question is "no", then this process is complete. If however, the answer is "yes", the "output intersection" process 310 is initiated. Upon completion of the "output intersection" process 310, the determination is made in step 384 if additional projected path of travel segments are to be drawn. If not, the process is complete. If so, the process loops back up to step 338, in order to output the next complete segment in the projected path of travel. The process loops in this manner until no additional projected path of travel segments need be drawn.

The straightening that occurs in the projected path of travel of the linear format can happen in two ways. In the first case, an individual segment that is curved (meaning that the original TIGER/LINE data for this segment must have contained one or more intermediate shape points) will appear as a straight transportation segment. Transportation segments that were already straight (having no intermediate TIGER/LINE shape points) will retain their straight appearance. Non-curving transportation segments need not be straightened. In the second case, two path of travel segments which are contiguous, but which were not previously aligned in a collinear fashion, may be aligned under certain conditions as described below.

The continuation of the current segment in the projected path of travel beyond an intersection node is referred to here as the "opposite" segment. If an "opposite" segment can be found, the current and "opposite" segments will be depicted in a vertically aligned manner. At the start of the "output intersection" process 310 depicted in FIG. 19, a current segment has already been established. Intersecting segments that share the same end nodes have also been retrieved. The process for outputting the intersection is the same regardless of whether you are dealing with a "FROM" node or a "TO" node. The process begins in step 314 by determining the segment opposite to the current segment. "Opposite" in this case means that it will appear opposite to and directly aligned with the current segment in the projected path of travel. In many cases the opposite segment will have the same street name as the current segment. This is likely to occur because adjoining segments of one street are typically oriented in substantially the same direction of travel where they join. That portion of Market Street with addresses in the 200's, for example, is likely oriented in the same direction of travel as the portion of Market Street with addresses in the 300's. This will not, however, always be the case. At times, the street name changes from one segment of a street to the adjoining continuation segment. It might be, for example, that 3rd Street is renamed as James Street for a portion of its multi-segment length. In some cases there will be no opposite segment. Such a case occurs at the node in question if the current intersection has only one additional intersecting segment, and if that segment meets the current segment at a roughly perpendicular angle.

Figure 20A:
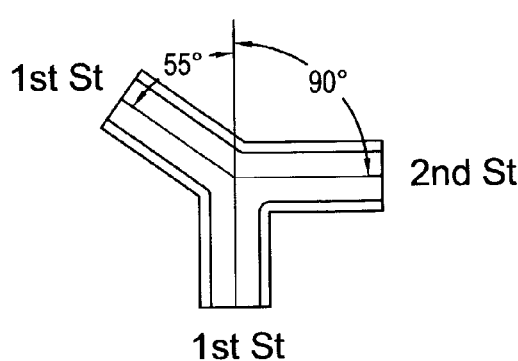
FIGS. 20A through 20E are street intersection diagrams intended to illustrate the process to determine "opposite" segments in the projected path of travel for a first embodiment of the present invention.

The process of determining the "opposite" segment involves determining the angle that each intersecting segment makes relative to an extended "current" segment centerline. This angle is referred to here as the "angle of incidence". When determining the angle of incidence for an intersecting segment, the value specified in the ANGLE field of the NODE Table 93 of the database 38 is compared with the ANGLE value given for the current segment at the same node. The name given to the candidate "opposite" segments is also an influencing factor. To illustrate these points, reference is made to the street intersection diagrams depicted in FIGS. 20A through 20E. FIG. 20A shows an intersection with three intersecting segments. The vertically oriented segment of 1st Street at the bottom of the diagram is to be considered the "current" segment. Note that the centerline of this segment projects vertically beyond the segment toward the top of the diagram. This extension of the current segment is used when determining the angle of incidence for the other intersecting segments. The angle of incidence for 2nd Street is shown as 90 degrees. The angle of incidence for the continuation of 1st Street is 55 degrees. In order to choose an "opposite" segment in this case, we take advantage of the first rule which states that the segment with the smallest angle of incidence among those segments having the same name as the "current" segment will be designated as the opposite segment if this angle of incidence is less than or equal to 70 degrees. This is the case in FIG. 20A, so the continuation of 1st Street will be chosen as the "opposite" segment. Note that a segment that has the same name as the "current" segment, and that has an angle of incidence that falls within the angle range of 70 degrees or less, will be designated as the "opposite" segment even if a segment with some other name has a smaller angle of incidence. This is illustrated in FIG. 20B, where the name of the street (in this case 1st Street) takes precedence over the angle of incidence (20 degrees for 2nd Street), in determining that the continuation of 1st Street (with its 55 degree angle) should be chosen as the "opposite" segment.

Figure 20B:
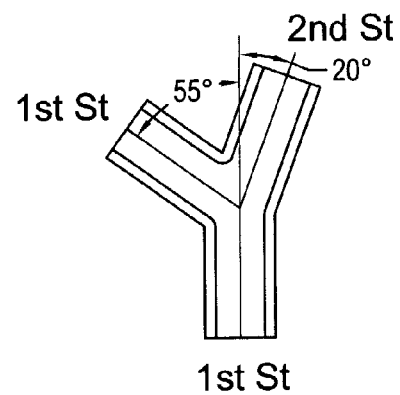
Figure 20C:
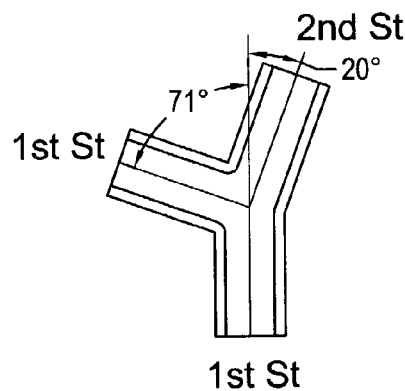

FIG. 20C is nearly identical to FIG. 20B except that the angle of incidence for the continuation of 1st Street is 71 degrees. This angle exceeds the 70-degree maximum specified in the first rule. We must therefore rely upon the second rule which states that if no segments meet the conditions of the first rule, the segment with the smallest angle of incidence will be chosen as the "opposite" segment as long as the angle of incidence falls within an angle range from 0 to 55 degrees. Following this second rule, the 2nd Street segment will be designated as the "opposite" segment in FIG. 20C.

Figure 20D:
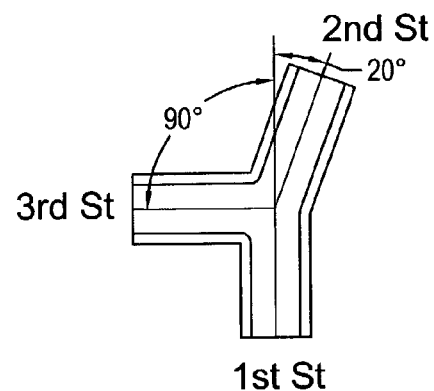

FIG. 20D illustrates an intersection where none of the intersecting segments has the same name as the "current" 1st Street segment. We must therefore rely on the second rule in determining that 2nd Street, with the smaller angle of incidence, should be the "opposite" segment.

Figure 20E:
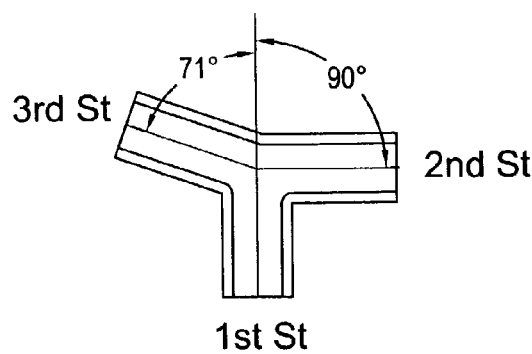

It is possible that by following the two rules mentioned above, no "opposite" segment will be found. An example of such an intersection is illustrated in FIG. 20E. In this case, none of the intersecting segments shares its name with the "current" 1st Street segment. Note also that the angle of incidence for both 2nd and 3rd Streets is greater than 55 degrees. Neither the conditions of the first or the second rule have been met. We will therefore end up with a "T" shaped intersection in our HTML representation similar to that which is illustrated in FIG. 24B. No "opposite" segment, in this case, is found.

Figure 19:
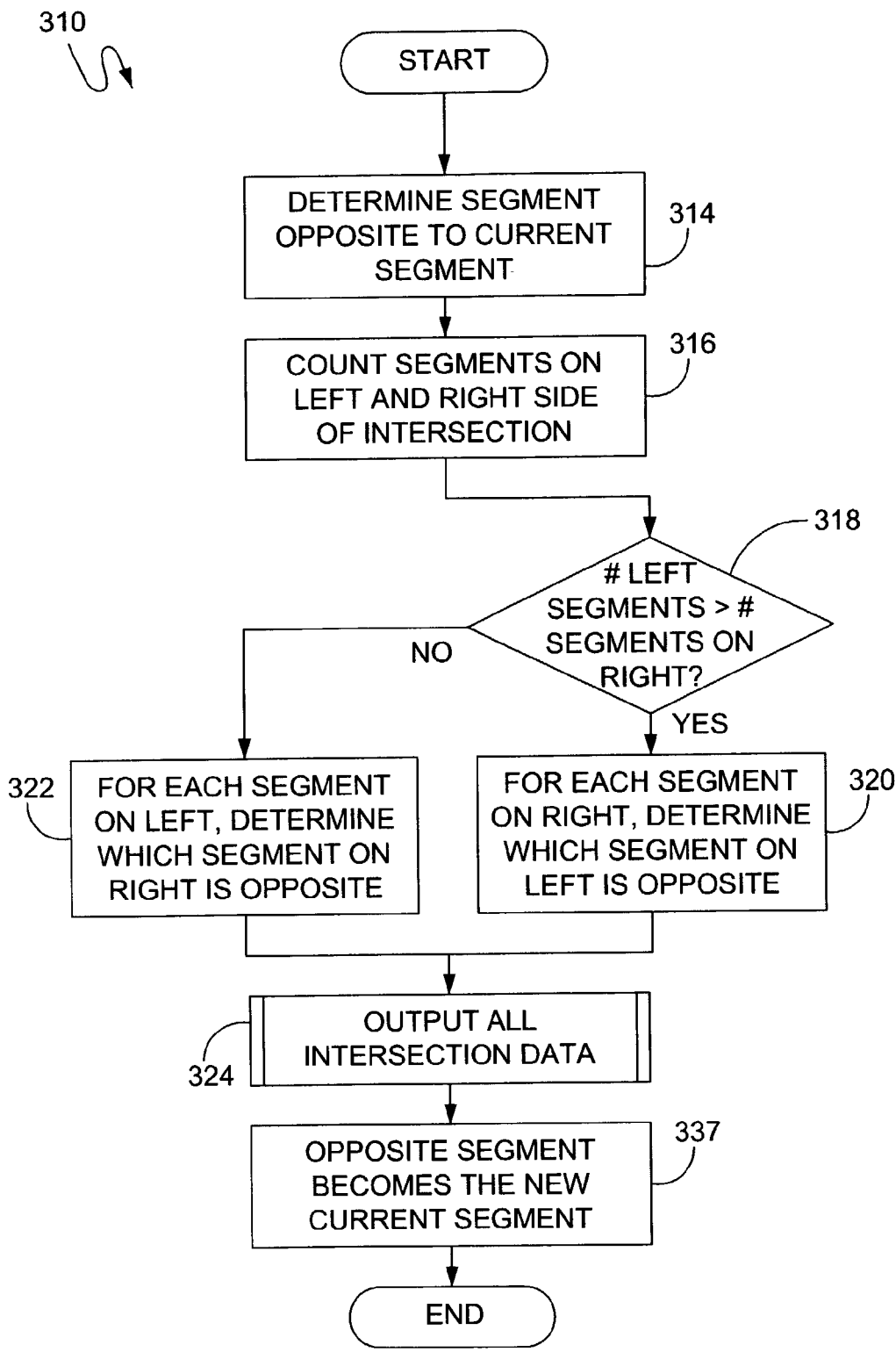
FIG. 19 is a flow chart of the Output Intersection process referred to in FIG. 18 for a first embodiment of the present invention.
Figure 21:
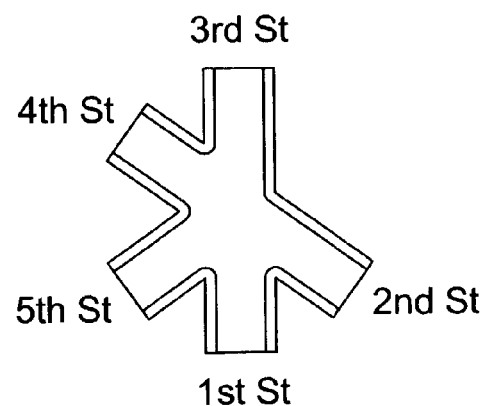
FIG. 21 is a street intersection diagram intended to illustrate the concept of "left side" and "right side" intersection segments for a first embodiment of the present invention.

Once the opposite segment has been determined, the next step in the flowchart of FIG. 19 is to count the segments on the left and right side of the intersection 316. This issue is illustrated in FIG. 21, which depicts an intersection node with five intersecting segments. Note that we have a substantially straight line of travel as we move from the "current" segment (1st Street) to the "opposite" segment (3rd Street). If we begin at the "current" segment (1st Street), and fan our way around the intersection toward the "opposite" segment (3rd Street) in a counter-clockwise fashion, then it should be clear that any segments found between the "current" and "opposite" segments would fall on the right side of the intersection (assuming an upward direction of travel from 1st Street to 3rd Street). The 2nd Street segment in FIG. 21 would be considered a right side segment. Similarly, if we continue to fan our way around the intersection from the "opposite" segment (3rd Street) toward the "current" segment (1st Street) in a counter-clockwise fashion, then the segments for 4th and 5th Streets would be left side segments. In order for this left and right side ordering concept to make sense, it is necessary to envision a direction of travel upward from the "current" segment to the "opposite" segment. This direction of travel coincides with the projected path of travel.

Referring back to FIG. 19, if the number of left side segments is found to be larger than the number of right side segments in the subsequent decision block 318, then control flows to step 320. If however, the number of right side segments is equal to or greater than the number of left side segments then control flows to step 322. The intersection illustrated in FIG. 21 shows two left side segments (4th & 5th Streets) and one right side segment (2nd Street). In this example, the left side segments outnumber the right side segments so control flows to step 320. This step states that for each segment on right we should determine which segment on the left is opposite. This process is essentially identical to that which occurred in step 314 and so will not be addressed again here. Suffice it to say that the segment found to be opposite 2nd Street in FIG. 21 is 4th Street. This issue of "opposite" segment is important in that it determines how the intersections are depicted in the HTML formatted output. The process in step 322 is identical to that in step 320 except that the right side segments outnumber the left side segments and that opposites are found for the segments occurring on the left, rather than the right as described above. As the left side, right side, and associated opposite segments are found, this information is placed in an intersection array. This array shows which transportation segments will be depicted opposite one another in the graphical depiction of the intersection.

The next step in the process employs the intersection array to output all of the intersection segment data 324. In the HTML formatted output of the first embodiment it is quicker to use color filled table cells to represent transportation segments than it is to display angled intersection segments as imported graphic files. For this reason, all intersecting roads are shown intersecting the projected path of travel in a perpendicular fashion. This concept is illustrated in FIGS. 22A through 29B. In each case, the figures with the "A" suffix (FIGS. 22A, 23A, 24A, 25A, 26A, 27A, 28A, and 29A) show the intersection as it actually occurs, and the figures with the "B" suffix (FIGS. 22B, 23B, 24B, 25B, 26B, 27B, 28B, and 29B) show the intersection as it is displayed in the HTML table. FIG. 28B, for example, is the HTML table version of FIG. 28A in the first embodiment of the present invention. When WML is employed in the first embodiment, a number of GIF files are used to represent the various node intersection configurations.

Figure 30:
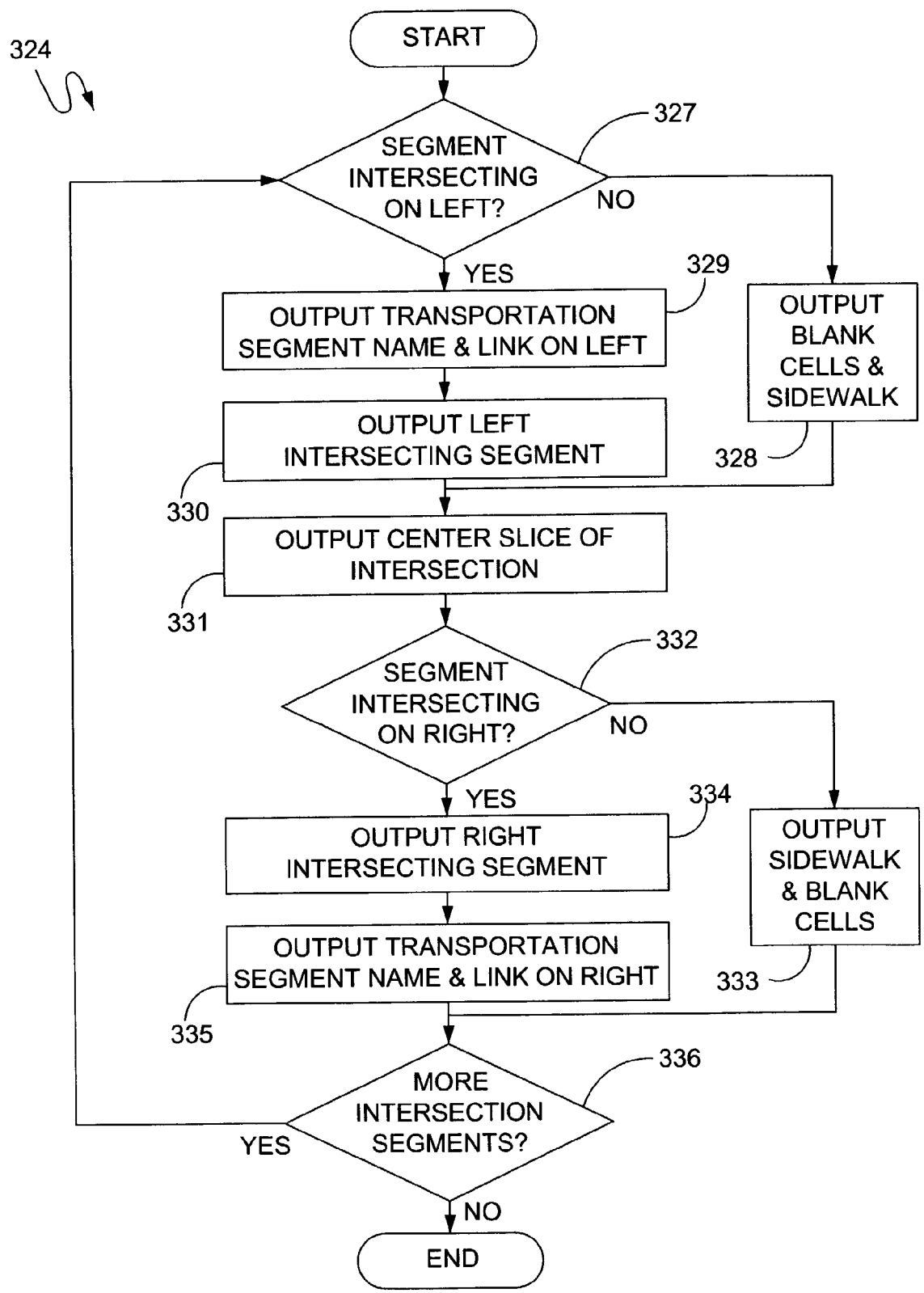
FIG. 30 is a flow chart of the Output All Intersection Data process referred to in FIG. 19 for a first embodiment of the present invention.

The individual steps required to output all intersection data 324 in the HTML table formatted embodiment are illustrated in FIG. 30. At the top of the flowchart, a looping process begins in which the intersection data is output one table row at a time. Decision block 327 asks if there is a segment intersecting on the left. If not, blank cells, and a light gray cell representing a sidewalk, are output to the left part of the current table row in step 328, and control passes to step 331. If there is a left side intersecting segment, step 329 involves outputting the transportation segment name and link on the left. The intersecting partially depicted transportation segment is then output in step 330 (by modifying background colors of specific cells). The center slice of the intersection (depicting the road pavement) is output in step 331. The process continues in step 332 by checking the intersection array to determine if there is a segment intersecting on the right. If not, the right side sidewalk and blank cells are formatted in step 333. If there is an intersecting segment on the right, the partially depicted segment is formatted in step 334. The row is completed in step 335 by outputting the transportation segment name and transportation segment link on the right. Decision block 336 asks if there are more intersection segments. If so, control is passed back to step 327 in order to format another table row in the intersection. If not, the process to output all intersection data 324 is complete. This process differs in the WML formatted output in that one or more GIF image files are employed in WML to represent the intersecting segments.

Referring now back to FIG. 19, the final step 337 in the "output intersection" process 310 is to establish what had previously been the "opposite" segment as the new "current" segment. This is necessary in order to continue to display segments along the projected path of travel in those cases where the display of a multi-segment path of travel is specified.

Figure 31:
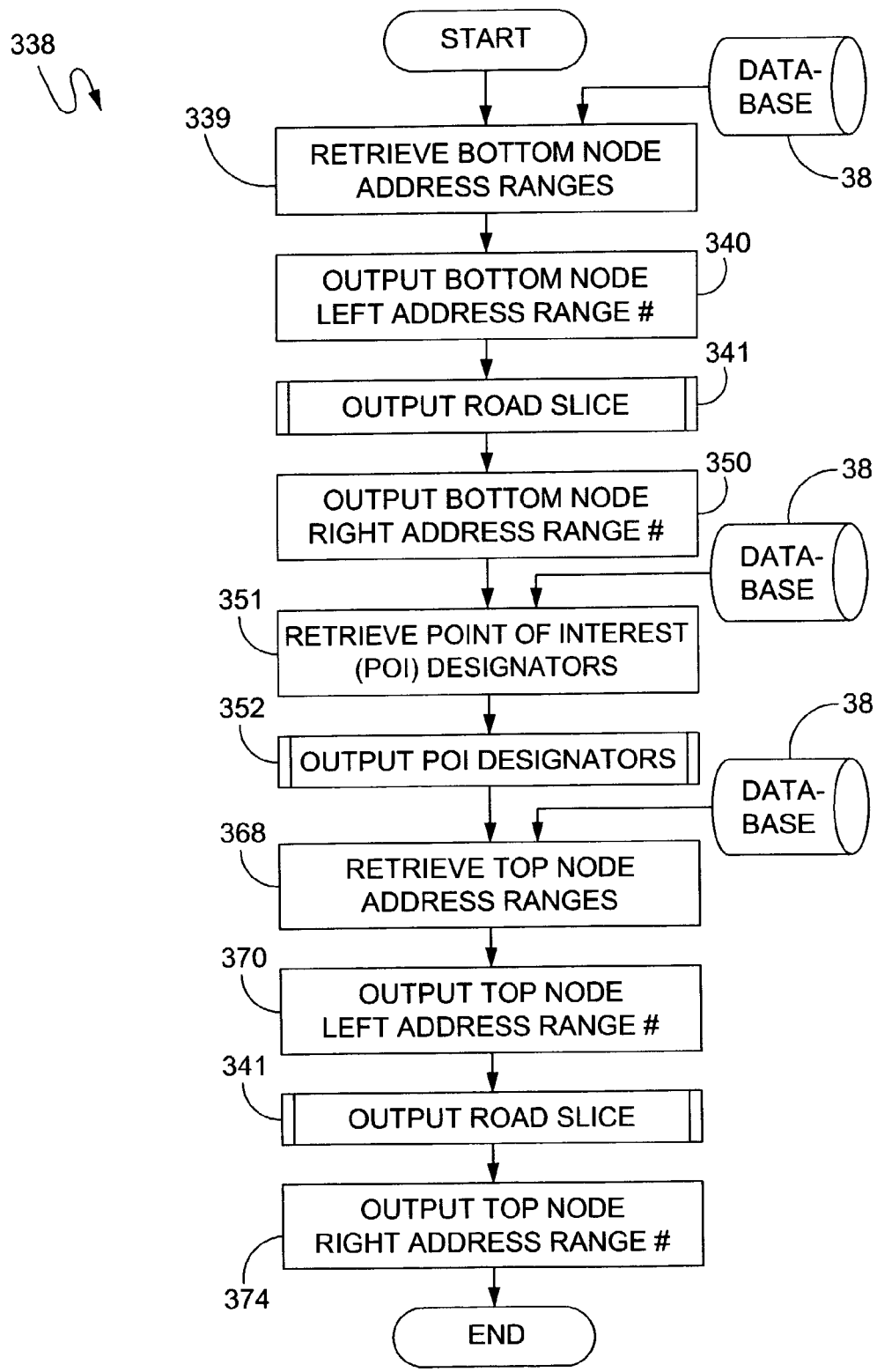
FIG. 31 is a flow chart of the Output a Projected Path of Travel Segment process referred to in FIG. 18 for a first embodiment of the present invention.

The flowchart in FIG. 31 illustrates the "output a projected path of travel segment" process 338 first referred to in FIG. 18. This process fills in the portions of the segments in between two intersections. Since the depiction of a complete segment in a predetermined route or in the projected path of travel is always oriented in the upward direction in the output display, this process begins just above the previously generated bottom node intersection and works its way up to just below the subsequently generated top node intersection. The output is being formatted as a table (either in HTML or WML), so the process will generate one table row at a time. Each row is output as a series of single or grouped cells going from left to right on the table.

Each transportation segment that represents a road in the database 38 of the first embodiment has associated address ranges. The first step 339 is to retrieve the bottom node address ranges from the database 38. Once retrieved, the address range number on the left side of the bottom node is output to the table in step 340. Note that this will either be a "FROM" node left address range number, or a "TO" node right address range number, depending on whether the address numbers are ascending or descending as one travels up the road. The output road slice step 341 occurs next. The final step in the generation of the current table row, is to output the address range number on the right side of the bottom node 350. Again, depending upon the ascending or descending nature of the address numbers, this will either be a "FROM" node right address range number, or a "TO" node left address range number.

Figure 35:
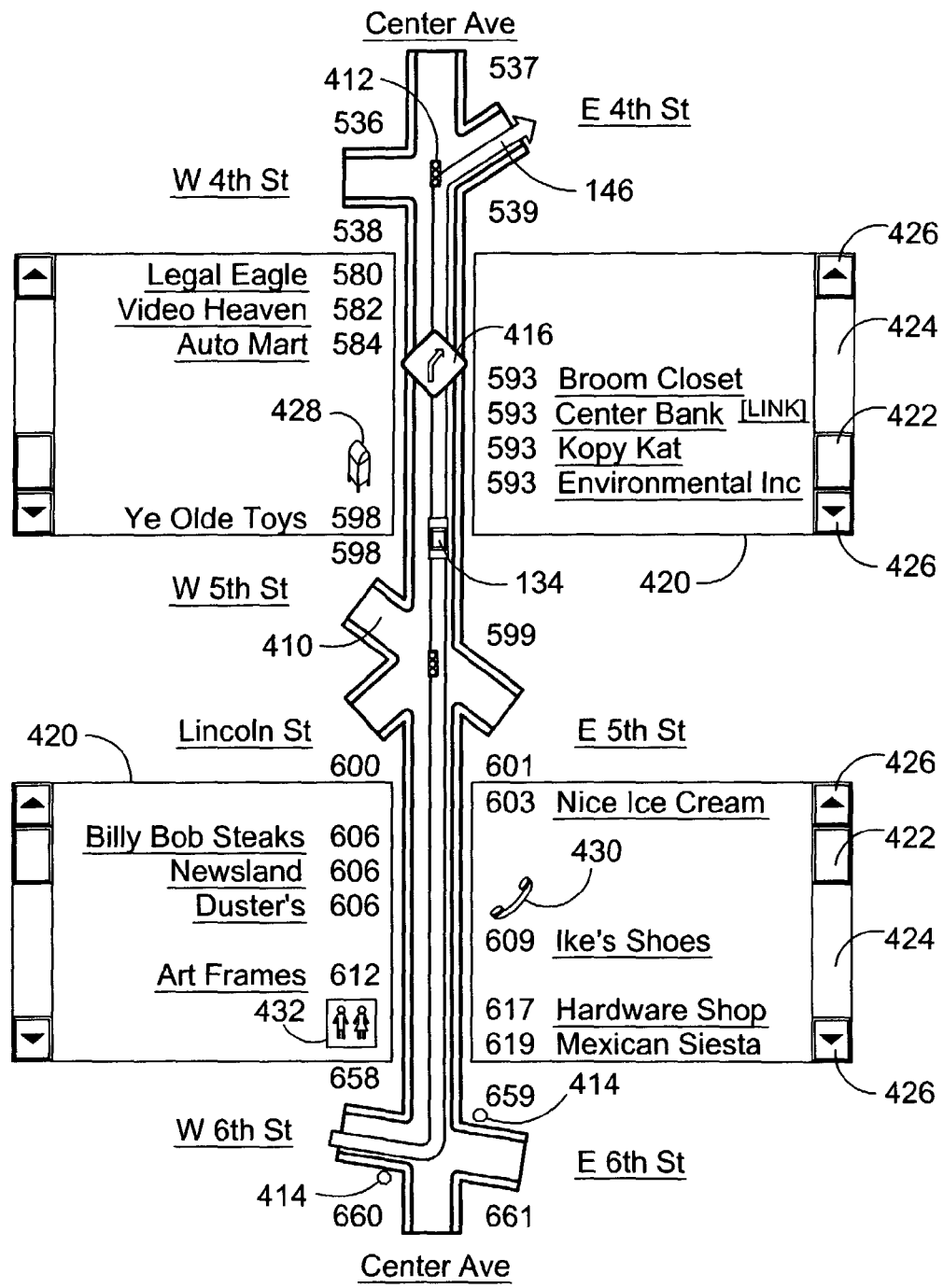
FIG. 35 is an illustration depicting the use of a vector based graphics format to provide a graphical user interface with a linear map component including scrollable list boxes in an alternative embodiment of the present invention.

In the case of the WML table, the output road slice step 341 involves outputting a simple GIF formatted graphics file 168 to the cell at the center of the row. The HTML version involves specifying the background colors for the series of cells in the current row at the center of the table that will represent the roadway (with an optional dashed yellow stripe down its center and sidewalks on either side). As stated previously, some text must also be outputted to the colored cells in order for the background color to be displayed. In this case, a single period is output in the same color as the specified background color. An additional element such as a condition graphic, or a user position icon, is sometimes displayed in a road slice. A condition graphic is a graphical element that depicts some condition that exists in its associated transportation segment. An example would be a turn that occurs along a stretch of a road. The condition graphic in this case might be depicted as a street sign alerting the user that there is a turn in the road. The graphic would be depicted at a location along the straightened path of travel segment at which the condition occurs (regardless of whether or not such a sign actually exists along the road). An example of a condition graphic 416 is shown in FIG. 35. A user position icon (UPI) is a graphical element that shows the user his or her actual location relative to the depicted transportation segments when mobile systems with location determining devices are employed. A UPI is also used to show the location that matches with an address typed into the address field when the GUI is employed in conjunction with a search engine. An example of a UPI 134 is shown in FIG. 5.

Figure 32:
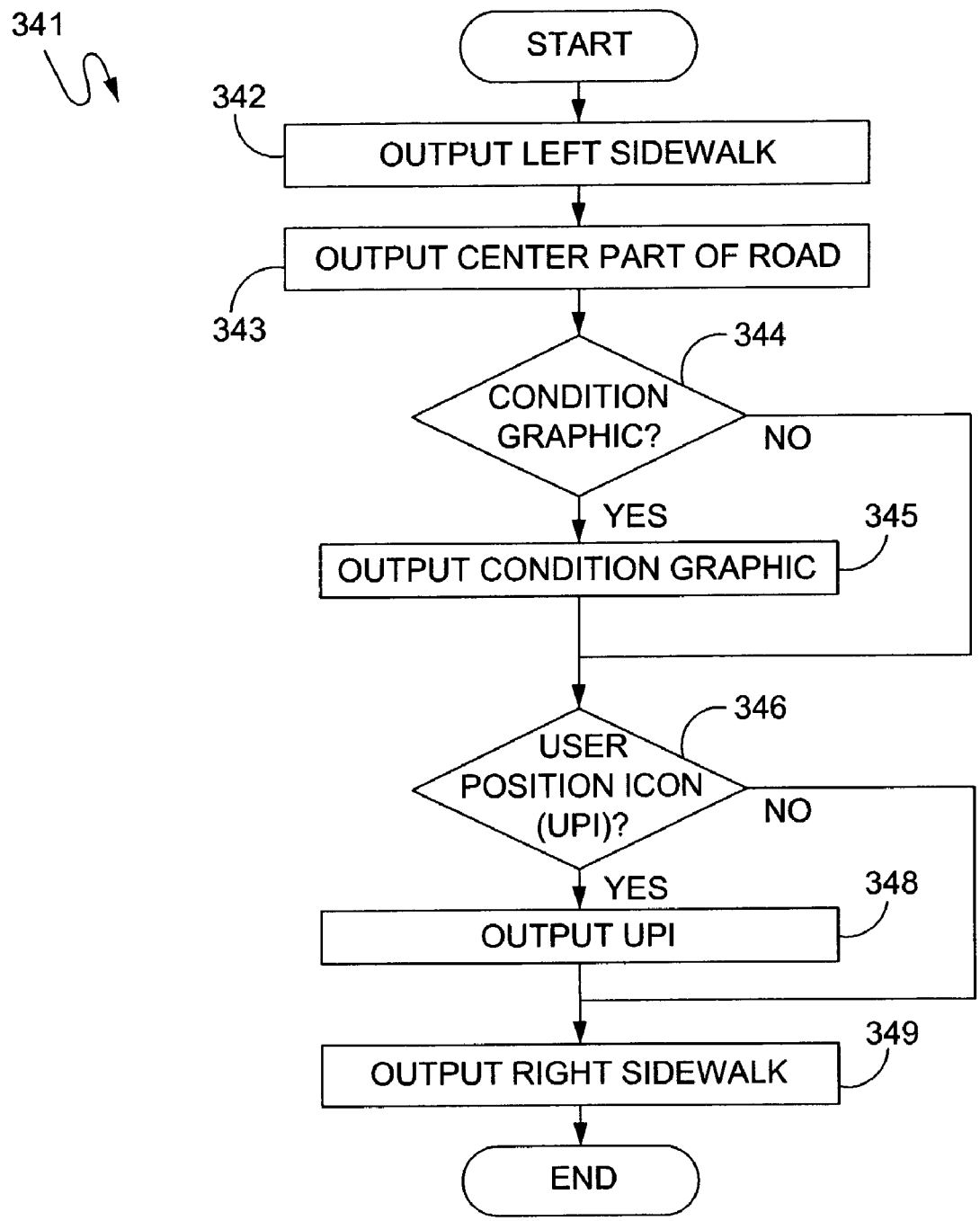
FIG. 32 is a flow chart of the Output Road Slice process referred to in FIGS. 31 and 33 for a first embodiment of the present invention.

FIG. 32 depicts a flowchart relating the steps involved to output a road slice 341. The word 'slice' is used to relate the notion that a complete path of travel segment is represented by a series of slices (or rows) in the HTML table formatted embodiment of the present invention. Step 342, to output the left sidewalk, occurs at the top of the flowchart. As stated above, this involves specifying a background color and placing a small text element in a specific cell of the table. The step to format the center of the road 343 as a darker background color follows. Step 344 inquires if a condition graphic is to be shown. If so, a condition graphic image file is specified for display over the background road representation in the current road slice in step 345. Step 346 inquires if a UPI 134 is to be displayed. If this is the case, an image file depicting the UPI is output on top of the road background in step 348. If there is no UPI 134 to output, control passes to step 349. The final step in the process is to output the right sidewalk 349.

The database 38 in the first embodiment of the present invention includes POI data for businesses that are located along the included transportation segments. The various components of this data were discussed previously and illustrated in FIG. 4. In the HTML version of the first embodiment, the POI designators 140, and associated address numbers 142 are output to the main GUI screen 110. The example WML output illustrated in FIG. 11A did not show this information, but it could be shown in the WML format. In most cases, odd numbered addresses occur on one side of the street, with even numbered addresses on the opposite side. The range of address numbers associated with a road (or transportation segment) are represented by the FRADDL, TOADDL, FRADDR, and TOADDR fields in the database 38. An effort is made to order the displayed output of the POI designators 140 and associated address numbers 142 in a fashion that resembles the actual ordering that occurs on the road. Only one POI designator 140 is placed on any single table row. The general sequence of outputting a POI designator 140 on a table row will, therefore, depend on whether the address number 142 occurs on the left or the right side of the road. The steps involved in outputting the POI designator rows are described below.

Figure 33:
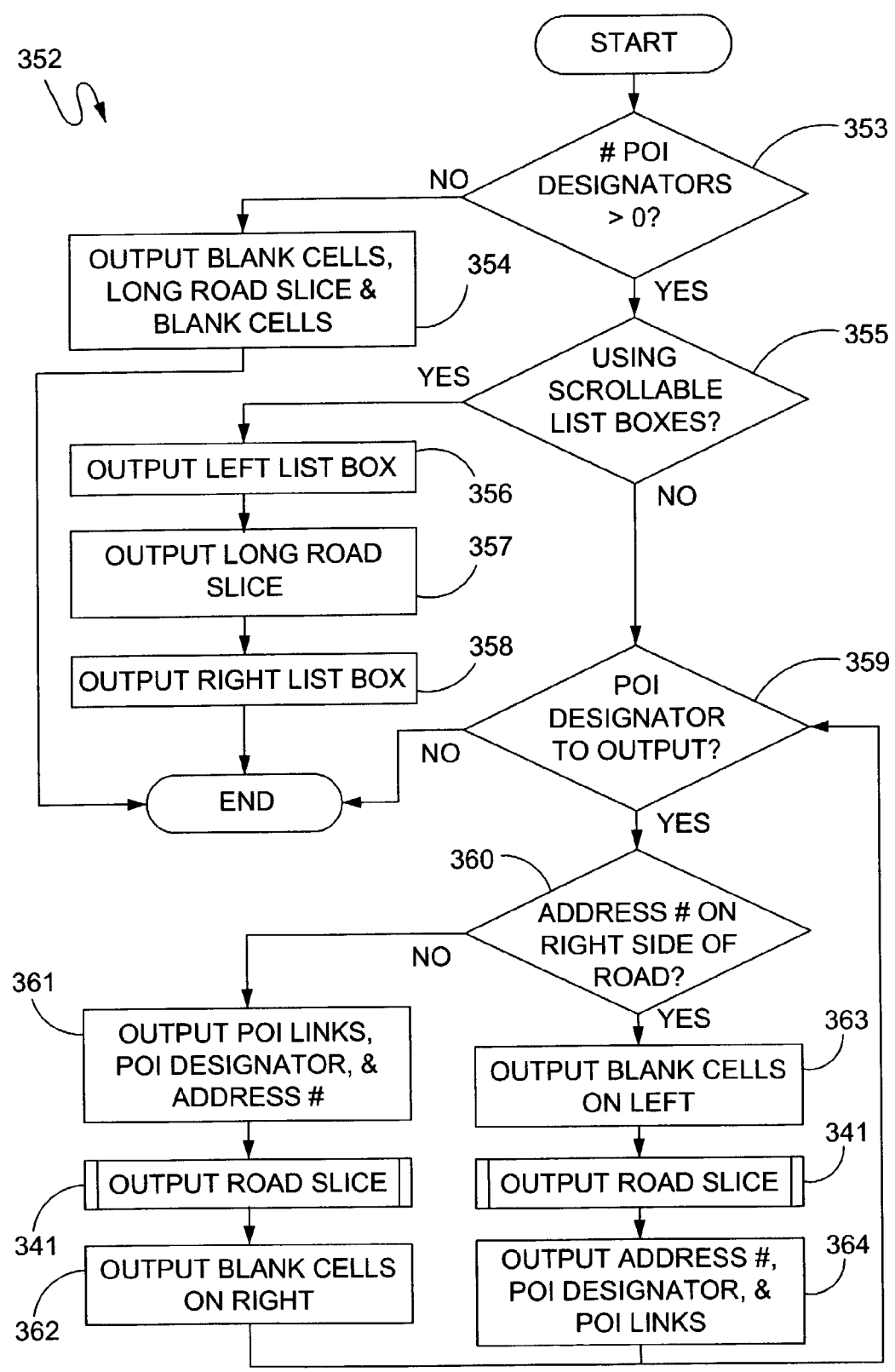
FIG. 33 is a flow chart of the Output POI Designators process referred to in FIG. 31 for a first embodiment of the present invention.

In the portion of the flowchart depicted in FIG. 31 related to outputting POI designators, the first step 351 involves retrieving ordered POI designators from the database 38. The next step 352 initiates the "Output POI Designators" process which is illustrated in FIG. 33. The decision block 353 at the top of FIG. 33 is concerned with the number of POI designators found. If this number is zero, the flow passes to step 354 in order to output blank cells on the left, a long road slice down the middle, and blank cells on the right side of the current table row. If however, at least one POI designator was found, control is passed to decision block 355. In this step a variable is accessed to determine if scrollable list boxes are being used. If so, a scrollable list box is output on the left side of the road in step 356. The list box on the left is populated with POIs that are located on the left side of the associated transportation segment. Scrollable list boxes can be placed in individual cells (or in groupings of cells) within a HTML table. Next a long road slice is output in step 357. Finally, a scrollable list box is output to the right side of the road segment in step 358, and the process of outputting POI designators is complete. Scrollable list boxes will be addressed in greater detail in the description of an alternative embodiment which follows.

If list boxes are not employed, control passes to step 359 to begin a looping process in which each POI designator adds one row to the table. The decision block 359 asks if there is a POI designator to output. In some cases there may not be any POI designators associated with the transportation segment in question, or the output of this type of data may be disabled. If this is so, the POI output process is complete. If however, at least one POI designator was retrieved from the database 38 in step 351, the process is directed to decision block 360 and a determination is made regarding whether the POI falls on the left or right side of the road. For left side POIs, the sequence of steps is to first output POI links 144 (if any), the POI designator 140, and the address number 142 in step 361, then to output the road slice 341, and finally to output blank cells 362 on the right side of the table row. For right side POIs, the sequence of steps is to first output the blank cells 363 on the left, then to output the road slice 341, and finally to output the address number 142, POI designator 140, and any associated POI links 144 in step 364. After each POI designator table row, the flow is looped back to decision block 359. When there are no more POI designators to output, flow is directed to step 368 in FIG. 31.

Step 368 involves retrieving the top node address ranges from the database 38. Once retrieved, the top node left address range number is output to the table in step 370. The output road slice step 341 occurs next. As stated above, when working in WML format this step requires outputting a single GIF formatted graphics file 168. Background colors for the series of cells at the center of the table are specified when working in HTML format. The final consideration in the generation of the current table row, is to output the top node right address range number in step 374.

Alternative Embodiments

While the present invention has been described with reference to one or more particular embodiments, it will be appreciated by those of ordinary skill in the art that a wide range of changes and modifications to the embodiments described above may be made without departing from the spirit and scope of the present invention. The geography employed in the exemplary embodiment includes road networks contained in specific cities, but the database need not be limited to real world geographic areas. In an alternative embodiment, topical information related to imaginary geographical areas or fictional virtual worlds can be displayed. Another alternative embodiment simulates a non-geographical system comprising a network of interconnected nodes. Such alternative embodiments have applications in gaming, and in the general area of knowledge representation.

Many computer languages including JAVA (trademark of Sun Microsystems, Inc., Santa Clara, Calif.), C++, VISUAL BASIC (trademark of Microsoft, Corp., Redmond, Wash.), or others can be used to code alternative embodiments. Likewise, many possible file formats can be employed rather than HTML or WML (some of which have been mentioned above). These types of modifications will not alter the scope of the present invention. In addition to, or instead of the Internet, an alternative embodiment can be incorporated into a host-based system such as AMERICA ONLINE (trademark of AOL Time Warner, Inc., New York, N.Y.), into a specific company's intranet, or into a stand-alone system with its own server software. There are many possible methods that can be employed for determining the location of the geographical area to be depicted. The first embodiment describes a method whereby the desired location is manually entered in the form of a textual address, but those skilled in the art will recognize that this process can be accomplished through the use of a location determining device, and that this will not alter the scope of the present invention. The location determining device in this case can be a GPS receiver 47, a cellular telephone (which includes position determining capabilities), or other devices that are able to determine a user's location. In the case when the location determination process is automated via the use of a location determining device, the depicted portion of the scrollable main GUI screen 110 can be automatically updated (or scrolled) to reflect the constant updating of the user's current location. Manually inputting a textual address is appropriate in the case of a location based search engine. The GPS receiver 47 approach (or more generally, the location determining device approach) is appropriate for many mobile applications. Another alternative approach to the location determination process involves entering a search string relating to a business type or product, rather than an address. In such a case, only a subset of the total number of businesses associated with a specific transportation segment may be depicted in the generated main GUI screen 110.

The transportation segments that are depicted in 2-Dimensional fashion in the first embodiment can be viewed from a 3-Dimensional or aerial perspective in an alternative embodiment. Detail can be added to the representation of the roadways as described in the first embodiment in numerous ways including depicting the number of lanes in the road, and depicting the location and content of actual road signs. These modifications fall within the spirit and scope of the present invention.

Modifications can also be made in the display of the textual data associated with the transportation segments. Address ranges can be color-coded to distinguish addresses that occur at the extremes of the given range for any single block. If, for example, the left side range for the block is from 1 to 99, then any businesses occurring on the street corner at address numbers 1 or 99 can have the address number shown in a distinguishing color such as red. POI designators such as business listings or entity names can also be color-coded such that all businesses occurring in the same building (at the same street address) are grouped visually by having the same background color. In a similar fashion, text background color-coding can be employed to specify business type. Although POI designators are represented as textual names in the first embodiment, graphical icons (including logos) related to the POIs could also be used. The topical information displayed with the generated output need not be limited to business listings. Many other categories of information can be associated with specific locations. Some examples include residential listings, historical event data, crime data, demographic data, product data (relating to brands or products in use or for sale at specific locations), architectural data (relating to issues such as occupancy type, construction type and square footage), real estate data, and current event data (describing upcoming events at specific locations).

FIG. 34 depicts an alternative embodiment intended for email systems. As shown in this figure, the linear format can be embodied in a graphically stripped down form as a non-HTML email document. Most email client programs permit functioning hypertext links to be embedded in an email message. Many email client programs hide the HTML portion of a hypertext link so that all the user sees is an underlined word or short phrase. This is most commonly the case for email client programs that are embedded in web browsers such as Netscape NAVIGATOR (trademark of AOL/Netscape Communications Corp., Mountain View, Calif.). By hiding this HTML code, the user is presented with an email message that looks very similar to the table based versions of the linear format described in the first embodiment above. The underlined street names in FIG. 34 serve as transportation segment links to initiate the transmission of additional email messages depicting the linear formatted data for the selected transportation segments. Similarly, the underlined POI designators serve as POI links to initiate the transmission of information related to the chosen POI. In order for the email message to be displayed properly, the font employed must be one in which all characters have the same width, such as the Courier New font. Note also that some email client programs permit email messages to be composed in HTML format. For these systems, generated HTML web pages can be sent directly. Although there are some definite differences between this alternative version and the first embodiment as described above, the generation of the linear format follows many of the same methods employed in the first embodiment. This is also true of the vector based alternative embodiment described below.

Another alternative embodiment of the present invention employs FLASH (trademark of Macromedia Inc., San Francisco, Calif.) rather than using tables in HTML or WML. FLASH is a visually rich vector graphics based format and platform. Other vector based formats such as Scalable Vector Graphics (SVG) or JAVA Graphics could be used in additional alternatives. Specific modifications incorporated into the FLASH based alternative embodiment are illustrated in FIG. 35. In this case, FLASH MX is used in a remote capacity in conjunction with COLDFUSION. The FLASH Player is loaded onto a significant majority of Internet accessible systems and employed by many Internet sites to disseminate graphically intensive and interactive information. The latest version of COLDFUSION (referred to as COLDFUSION MX) is able to control a remotely located FLASH MX Player. In this alternative embodiment, portions of COLDFUSION programs related to the generation of the linear format are downloaded to the FLASH Player on the remote client device. With the HTML and WML table based approach, both the table formatting code and the data content had to be sent from the server computer to the client browser each time a new main GUI screen 110 was desired. The HTML table formatting code, as shown in Table 1, requires much more file space than that required by the actual data content which distinguishes one projected path of travel from another. Communicating with the server to generate new pages is accomplished much more quickly and efficiently in this alternative because only this unique data content needs to be sent from the server to the client. The code to generate the linear format is sent to the FLASH Player only once and stored on the client. Each subsequent page generation requires only that the actual data content (including the transportation segment names, address ranges, and POI designators) be sent.

The vector oriented FLASH alternative embodiment also makes it easy to incorporate certain graphical formatting modifications which would be possible in the HTML and WML table formats (using image files), but which would be much more cumbersome to produce. Although segments intersecting with the projected path of travel segments were depicted occurring at perpendicular angles in the HTML and WML table based first embodiment, non-perpendicular segments in this alternative could be depicted at non-perpendicular angles in order to better represent their true orientation. This would be easily accomplished with a non-table based vector drawing format such as FLASH. With a vector-based format, displaying intersecting roads at non-perpendicular angles can be accomplished as quickly and efficiently as displaying them at perpendicular angles. All three intersections including the middle intersection 410 in FIG. 35 illustrate this non-perpendicular intersecting road approach. Streetlights 412 and stop signs 414 (depicted as red octagons) are also incorporated into the FLASH based graphic depictions of intersections. Non-existent road signs are depicted to give an indication of the actual curvature of the road. The condition graphic 416 in the form of a road sign depicting a 30-degree turn is placed over the straightened transportation segment at the location at which the condition occurs (even though this sign may not occur along the road in reality). In another alternative, the condition graphic 416 depicts an accurate representation of the curvature of the complete transportation segment. Note also that a predetermined route graphic 146 is depicted in cases when a predetermined route has been set, as may be the case with in car navigation systems.

In the first embodiment generated with an HTML or WML table, the length of the individual projected path of travel segments can be dependent upon the number of associated POIs that were shown. A larger number of associated entities can result in a longer stretch of linear formatted road. This can be modified in HTML or in FLASH by using a scrollable list box on one side or on each side of the transportation segment. When scrollable list boxes (which are well known in the art) are employed, it is no longer necessary to build up the projected path of travel one row at a time. A longer slice of the projected path of travel can be output to the linear format in one step alongside, or in between, the depicted list boxes. As shown in FIG. 35, a scrollable list box 420 is a box that can contain a long listing of POI designators that can be viewed by moving a slider 422 along a scroll bar 424 at one side of the list box. When the listing of elements contained in the list box fits within the viewable area of the box, the scroll bar 424 is not depicted alongside the scrollable list box 420. A scrollable list box 420 is a desirable choice in cases such as high-rise office buildings where the list of occupants at a single address might number in the hundreds. With a scrollable list box 420, the depicted length of the complete transportation segments in the projected path of travel can be set at a suitable length. In some cases, individual entries in the scrollable list box 420 can be cascaded (or expanded). For example, an initial list box element for the Empire State Building might give only the address number and the name of the building. By clicking on a small icon next to the element, the user can cascade or expand it in order to view a scrollable list of all of the business tenants within the building (or of the individual floors of the building which could themselves be expanded). In addition to address numbers, building names, and POI designators in the form of business names, POI designators in the form of graphical icons representing businesses or various conveniences can be included in the list box listing. Examples incorporated into the scrollable list box 420 of FIG. 35 include a mailbox icon 428, public telephone icon 430, and public restroom icon 432.

The scrollable list box 420 is automatically scrolled when used in conjunction with mobile systems to reflect the current location of the mobile user. This is illustrated in FIG. 35 where the scrollable list boxes 420 above 5th Street have their associated sliders 422 at the bottom of each list, and the scrollable list boxes 420 below 5th Street have their sliders at the top of the list, to reflect the location of the user, shown as a user position icon (UPI) 134 (in the shape of an automobile), just above the 5th Street intersection. With mobile systems, including GPS receivers 47 and cellular telephone based network systems, movement of the UPI 134 occurs as a result of movement of the mobile system to reflect the user's current position relative to the depicted roads and intersections.

A manual input device (such as a keyboard 40, mouse 41, keypad, game pad, joystick, tracker ball, light pen, stylus pen, remote control, or touch screen) can also be employed to move the UPI 134 and thus to scroll the scrollable list boxes 420. On mouse 41 equipped systems, the user clicks and holds on the UPI 134 and moves it up or down the projected path of travel to scroll the listing (as if the car were a slider and the vertical roadway a long scroll bar). One UPI 134 can be used to simultaneously control the scrolling function of all of the scrollable list boxes 420 depicted in the main GUI screen 110.

Figure 36:
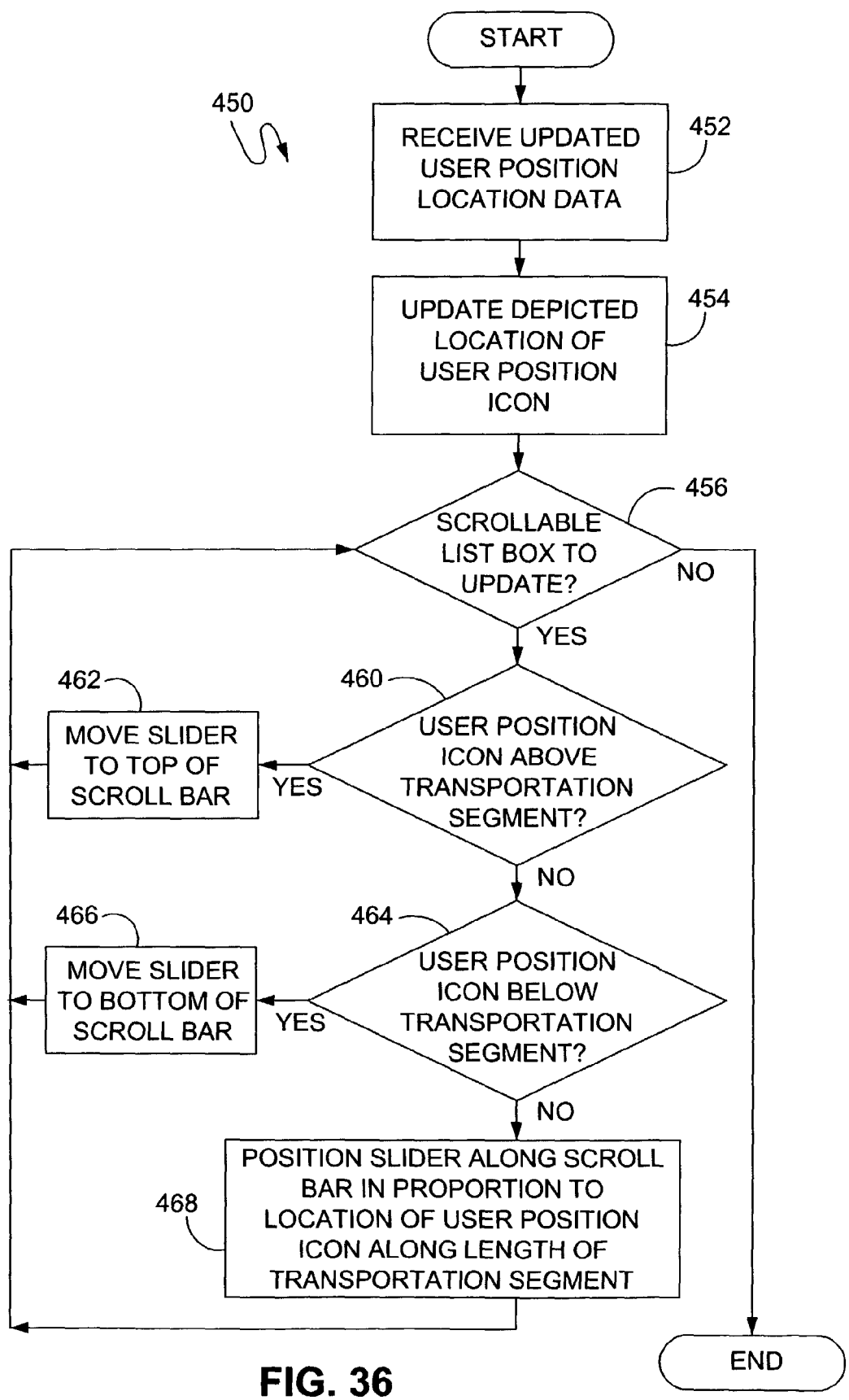
FIG. 36 is a flow chart of the Process to Automatically Update the Slider Position in Scrollable List Boxes for an alternative embodiment of the present invention.

FIG. 36 illustrates the process to automatically update the slider position in scrollable list boxes 450 based upon the movement of the UPI 134. In step 452, the controller means 12 receives the updated user position location data. This updated positional data is translated into a position along the linear formatted map component in the main GUI screen 110. The depicted location of the UPI 134 is updated in step 454. Once this occurs, a looping process to update all scrollable list boxes in the main GUI screen 110 begins in decision block 456. Step 456 asks if there is a scrollable list box to update. If the answer is no, the process is complete. If however, the answer is "yes", control passes to step 460 to determine if an imaginary horizontal line through the center of the UPI 134 appears above the transportation segment associated with the scrollable list box in question. If so, the slider 422 for this scrollable list box 420 is moved to the top of its scroll bar 424 in step 462 and control loops back to decision block 456. If this is not the case, a check is made to determine if an imaginary horizontal line through the center of the UPI 134 is below the transportation segment associated with the scrollable list box in decision block 464. If the answer is "yes", then the list box slider 422 is moved to the bottom of the scroll bar 424 and control loops to step 456. If the answer is "no", then an imaginary horizontal line through the center of the UPI 134, must be located vertically between the top and bottom nodes of the transportation segment associated with the scrollable list box 420 in question.

The UPI 134 causes scrolling within a particular scrollable list box 420 while it is positioned vertically between the top and the bottom nodes of the transportation segment associated with the scrollable list box 420. If, for example, the UPI 134 were positioned near the condition graphic 416 between 4th and 5th Streets in FIG. 35, and if POIs were distributed evenly along the length of this segment, the scrollable list boxes 420 adjacent to it would be scrolled with their sliders 422 near the centers of their associated scroll bars 424. In step 468 of FIG. 36, the slider 422 is positioned along the scroll bar 424 in proportion to the location of the UPI 134 relative to the total length of the transportation segment. This looping process occurs for each individual scrollable list box 420 in the main GUI screen 110 until all have been updated.

Although the UPI 134 can serve as a slider for multiple scrollable list boxes 420, the individual scroll bar sliders 422 can still be used independently of the UPI 134. This independent use of a scroll bar slider 422 affects only the associated scrollable list box 420, and does not affect the depicted location of the UPI 134.

It is intended that the foregoing detailed descriptions of the first and alternative embodiments be regarded as illustrative rather than limiting, and that it be understood that it is the following claims, including all equivalents, that are intended to define the spirit and scope of the invention.

TABLE 1

```
<HTML>
<TABLE BORDER="0"CELLSPACING="0"CELLPADDING="0">
<TR HEIGHT=1 BGCOLOR=#FFFFFF>
<TD><IMG SRC="images/162.gif"></TD><TD><IMG SRC="images/30.gif"></TD>
<TD><IMG SRC="images/29.gif"></TD><TD><IMG SRC="images/4.gif"></TD>
<TD><IMG SRC="images/14.gif"></TD><TD><IMG SRC="images/1white.gif" width="1"
height="1"></TD>
<TD><IMG SRC="images/14.gif"5</TD><TD><IMG SRC="images/4.gif"></TD>
<TD><IMG SRC="images/29.gif"></TD><TD><IMG SRC="images/30.gif"></TD>
<TD><IMG SRC="images/162.gif"></TD>
</TR>
<TR HEIGHT=50 ALIGN="MIDDLE">
<TD BGCOLOR=#FFFFFF WIDTH=479 HEIGHT=50 COLSPAN=11><FONT SIZE=3
COLOR=#0000FF><A HREF="mbot36.cfm?cty36061&cv=Centerville&sptr=100&seqno=2
&curft=8&len=2&opt=100_3&bw=480&#bot">Center Ave</A></FONT></TD>
</TR>
<TR HEIGHT=20 ALIGN="MIDDLE">
<TD BGCOLOR=#FFFFFF WIDTH=192 COLSPAN=2><FONT SIZE=1
COLOR=#FFFFFF>.</FONT></TD>
```

TABLE 1-continued

```
<TD WIDTH=29 BGCOLOR=#FFFFFF COLSPAN=1><FONT SIZE=1
COLOR=#FF0000>538</FONT></TD>
<TD BGCOLOR=#C0C0C0 WIDTH=4><FONT SIZE=1 COLOR=#C0C0C0>.</FONT></TD>
<TD BGCOLOR=#808080 WIDTH=14><FONT SIZE=1 COLOR=#808080>.</FONT></TD>
<TD BGCOLOR=#FFFF00 WIDTH=1><IMG SRC="images/1.gif" width="1" height="1"></TD>
<TD BGCOLOR=#808080 WIDTH=14><FONT SIZE=1 COLOR=#808080>.</FONT></TD>
<TD BGCOLOR=#C0C0C0 WIDTH=4><FONT SIZE=1 COLOR=#C0C0C0>.</FONT></TD>
<TD WIDTH=29 HEIGHT=20 BGCOLOR=#FFFFFF COLSPAN=1><FONT SIZE=1
COLOR=#FF0000>539</FONT></TD>
<TD BGCOLOR=#FFFFFF WIDTH=192 COLSPAN=2><ALIGN=LEFT><FONT SIZE=1
COLOR=#FFFFFF>.</FONT></TD>
</TR>
<TR HEIGHT=4 ALIGN="MIDDLE">
<TD BGCOLOR=#FFFFFF WIDTH=192 COLSPAN=2><FONT SIZE=1 COLOR=#FFFFFF><IMG
SRC="images/1.gif" width="1" height="1"></FONT></TD>
<TD BGCOLOR=#C0C0C0 WIDTH=29 COLSPAN=1><FONT SIZE=1 COLOR=#C0C0C0><IMG
SRC="images/1.gif" width="1" height="1"</FONT></TD>
<TD BGCOLOR=#808080 WIDTH=4><IMG SRC="images/ul4.gif" WIDTH=4></TD>
<TD BGCOLOR=#808080 COLSPAN=3 WIDTH=29><FONT SIZE=1 COLOR=#808080><IMG
SRC="images/1.gif" width="1" height="1"></FONT></TD>
<TD BGCOLOR=#808080 WIDTH=4><IMG SRC="images/ur4.gif" WIDTH="4"></TD>
<TD BGCOLOR=#C0C0C0 WIDTH=29 COLSPAN=1><FONT SIZE=1 COLOR=#C0C0C0><IMG
SRC="images/1.gif" width="1" height="1"></FONT></TD>
<TD BGCOLOR=#FFFFFF WIDTH=192 COLSPAN=2><FONT SIZE=1 COLOR=#FFFFFF><IMG
SRC="images/1.gif" width"1" height="1"></FONT></TD>
</TR>
<TR BGCOLOR="#808080" HEIGHT=22>
<TD BGCOLOR=#FFFFFF WIDTH=162 ALIGN=RIGHT HEIGHT=22><FONT SIZE=3
COLOR=#0000FF><A HREF="mbot36.cfm?cty=36061&cv=Centerville&sptr501&seqno=1
&curft=7&len2&opt=500__1&bw=480&#bot">W 5th St</A></FONT></TD>
<TD BGCOLOR=#FFFFFF WIDTH=30><FONT SIZE=1 COLOR=#FFFFFF>.</FONT></TD>
<TD WIDTH=29><FONT SIZE=1 COLOR=#808080>.</FONT></TD>
<TD WIDTH=4><FONT SIZE=1 COLOR=#808080>.</FONT></TD>
<TD BGCOLOR=#808080 WIDTH=29 COLSPAN=3><FONT SIZE=1
COLOR=#808080>.</FONT></TD>
<TD WIDTH=4><FONT SIZE=1 COLOR=#808080>.</FONT></TD>
<TD WIDTH=29><FONT SIZE=1 COLOR=#808080>.</FONT></TD>
<TD BGCOLOR=#FFFFFF WIDTH=30><FONT SIZE=1 COLOR=#FFFFFF>.</FONT></TD>
<TD BGCOLOR=#FFFFFF WIDTH=162 ALIGN=LEFT><FONT SIZE=3 COLOR=#0000FF><A
HREF="mbot36.cfm?cty=36061&cv=Centerville&sptr=500&seqno=1
&curft=8&len=2&opt501__1&bw=480&#bot">E 5th St</A></FONT></TD>
</TR>
<TR HEIGHT=4>
<TD BGCOLOR=#FFFFFF WIDTH=192 COLSPAN=2><FONT SIZE=1 COLOR=#FFFFFF><IMG
SRC="images/1.gif" width"1" height="1"></FONT></TD>
<TD BGCOLOR=#C0C0C0 WIDTH=29 COLSPAN=1><FONT SIZE=1 COLOR=#C0C0C0><IMG
SRC="images/1.gif" width="1" height="1"></FONT></TD>
<TD BGCOLOR=#C0C0C0 WIDTH=4><IMG SRC="images/ll4.gif" WIDTH="4"></TD>
<TD BGCOLOR=#808080 WIDTH=29 COLSPAN=3><FONT SIZE=1 COLOR=#808080><IMG
SRC="images/1.gif" width="1" height="1"></FONT></TD>
<TD BGCOLOR=#C0C0C0 WIDTH=4><IMG SRC="images/lr4.gif" WIDTH="4"></TD>
<TD BGCOLOR=#C0C0C0 WIDTH=29 COLSPAN=1><FONT SIZE=1 COLOR=#C0C0C0><IMG
SRC="images/1.gif" width="1" height="1"></FONT></TD>
<TD BGCOLOR=#FFFFFF WIDTH=192 COLSPAN=2><FONT SIZE=1 COLOR=#FFFFFF><IMG
SRC="images/1.gif" width="1" height="1"></FONT></TD>
</TR>
<TR HEIGHT=20 ALIGN="MIDDLE">
<TD BGCOLOR=#FFFFFF WIDTH=192 COLSPAN=2><FONT SIZE=1
COLOR=#FFFFFF>.</FONT></TD>
<TD WIDTH=29 ALIGN="MIDDLE" BGCOLOR=#009900 COLSPAN1><FONT SIZE=1
COLOR=#009900>.</FONT></TD>
<TD BGCOLOR=#C0C0C0 WIDTH=4><FONT SIZE=1 COLOR=#C0C0C0>.</FONT></TD>
<TD BGCOLOR=#808080 WIDTH=14><FONT SIZE=1 COLOR=#808080>.</FONT></TD>
<TD BGCOLOR=#FFFF00 WIDTH=1><IMG SRC="images/1.gif" width="1" height="1"></TD>
<TD BGCOLOR=#808080 WIDTH=14><FONT SIZE=1 COLOR=#808080>.</FONT></TD>
<TD BGCOLOR=#C0C0C0 WIDTH=4><FONT SIZE=1 COLOR=#C0C0C0>.</FONT></TD>
<TD WIDTH=29 ALIGN="MIDDLE" BGCOLOR=#FFFFFF COLSPAN=1><FONT SIZE=1
COLOR=#FF0000>537</FONT></TD>
<TD BGCOLOR=#FFF00F WIDTH=192 COLSPAN=2 ALIGN=LEFT><FONT SIZE=3><A
HREF="buspage36.cfm?bw480&a=537&b=Sue%27s%20Place&p=&n=Center&t=Av&s=&
cv=Centerville&h=4444&g=1">Sue's Place</A></FONT></TD>
</TR>
<TR HEIGHT=20 ALIGN="MIDDLE">
<TD BGCOLOR=#FFFFFF WIDTH=192 COLSPAN=2><FONT SIZE=1
COLOR=#FFFFFF>.</FONT></TD>
<TD WIDTH=29 ALIGN="MIDDLE" BGCOLOR=#009900 COLSPAN=1><FONT SIZE=1
COLOR=#009900>.</FONT></TD>
<TD BGCOLOR=#C0C0C0 WIDTH=4><FONT SIZE=1 COLOR=#C0C0C0>.</FONT></TD>
<TD BGCOLOR=#808080 WIDTH=14><FONT SIZE=1 COLOR=#808080>.</FONT></TD>
```

TABLE 1-continued

```
<TD BGCOLOR=#808080 WIDTH=1><IMG SRC="images/1.gif" width="1" height="1"></TD>
<TD BGCOLOR=#808080 WIDTH=14><FONT SIZE=1 COLOR=#808080>.</FONT></TD>
<TD BGCOLOR=#C0C0C0 WIDTH=4><FONT SIZE=1 COLOR=#C0C0C0>.</FONT></TD>
<TD WIDTH=29 ALIGN=MIDDLE" BGCOLOR=#FFFFFF COLSPAN=1><FONT SIZE=1
COLOR=#000000>533</FONT></TD>
<TD BGCOLOR=#FFFFFF WIDTH=192 COLSPAN=2 ALIGN=LEFT><FONT SIZE=3><A
HREF="buspage36.cfm?bw=480&a=533&b=Kids%20Kare&p=&n=Center&t=Av&s=&cv=Centerville&
h=4444&g=1">Kids Kare</A></FONT><FONT SIZE=1 COLOR=#000000>[<A
HREF="http://www.kidskare.com">LINK</A>]</FONT></TD>
</TR>
<TR HEIGHT=20 ALIGN="MIDDLE">
<TD BGCOLOR=#FFFFFF WIDTH=192 COLSPAN=2 ALIGN=RIGHT><FONT SIZE=1
COLOR=#000000></FONT></TD>
<TD WIDTH=29 HEIGHT=20 ALIGN="MIDDLE" BGCOLOR=#009900 COLSPAN=1><FONT
SIZE=1 COLOR=#009900>.</FONT></TD>
<TD BGCOLOR=#C0C0C0 WIDTH=4><FONT SIZE=1 COLOR=#C0C0C0>.</FONT></TD>
<TD BGCOLOR=#808080 WIDTH=14><FONT SIZE=1 COLOR=#808080>.</FONT></TD>
<TD BGCOLOR=#808080 WIDTH=1><IMG SRC="images/1.gif" width="1" height="1"></TD>
<TD BGCOLOR=#808080 WIDTH=14><FONT SIZE=1 COLOR=#808080>.</FONT></TD>
<TD BGCOLOR=#C0C0C0 WIDTH=4><FONT SIZE=1 COLOR=#C0C0C0>.</FONT></TD>
<TD WIDTH=29 ALIGN="MIDDLE"BGCOLOR=#FFFFFF COLSPAN=1><FONT SIZE=1
COLOR=#FF0000>501</FONT></TD>
<TD BGCOLOR=#FFFFFF WIDTH=192 COLSPAN=2 ALIGN=LEFT><FONT SIZE=1
COLOR=#FFFFFF>.</FONT></TD>
</TR>
<TR HEIGHT=4 ALIGN="MIDDLE">
<TD BGCOLOR=#FFFFFF WIDTH=192 COLSPAN=2><FONT SIZE=1 COLOR=#FFFFFF><IMG
SRC="images/1.gif" width="1" height="1"></FONT></TD>
<TD BGCOLOR=#C0C0C0 WIDTH=29 COLSPAN=1><FONT SIZE=1 COLOR=#C0C0C0><IMG
SRC="images/1.gif" width="1" height="1"></FONT></TD>
<TD BGCOLOR=#808080 WIDTH=4><IMG SRC="images/ul4.gif" WIDTH=4></TD>
<TD BGCOLOR=#808080 COLSPAN=3 WIDTH=29><FONT SIZE=1 COLOR=#808080><IMG
SRC="images/1.gif" width="1" height="1"></FONT></TD>
<TD BGCOLOR=#808080 WIDTH=4>IMG SRC="images/ur4.gif" WIDTH="4"></TD>
<TD BGCOLOR=#C0C0C0 WIDTH=29 COLSPAN=1><FONT SIZE=1 COLOR=#C0C0C0><IMG
SRC="images/1.gif" width="1" height="1"></FONT></TD>
<TD BGCOLOR=#FFFFFF WIDTH=192 COLSPAN=2><FONT SIZE=1 COLOR=#FFFFFF><IMG
SRC="images/1.gif" width="1" height="1"></FONT></TD>
</TR>
<TR BGCOLOR="#808080" HEIGHT=22>
<TD BGCOLOR=#FFFFFF WIDTH=162 ALIGN=RIGHT HEIGHT=22>
<FONT SIZE=3 COLOR=#FFFFFF><A HREF="mbot36.cfm?cty=36061&cv=Centerville&sptr=401
&seqno=1&curft=7&len=2&opt=400_1&bw=480&#bot">W 4th St</A></TD>
<TD BGCOLOR=#FFFFFF WIDTH=30><FONT SIZE=1 COLOR=#FFFFFF>.</FONT></TD>
<TD WIDTH=29><FONT SIZE=1 COLOR=#808080>.</FONT></TD>
<TD WIDTH=4><FONT SIZE=1 COLOR=#808080>.</FONT></TD>
<TD BGCOLOR=#808080 WIDTH=29 COLSPAN=3><FONT SIZE=1
COLOR=#808080>.</FONT></TD>
<TD WIDTH=4><FONT SIZE=1 COLOR=#808080>.</FONT></TD>
<TD WIDTH=29><FONT SIZE=1 COLOR=#808080>.</FONT></TD>
<TD BGCOLOR=#FFFFFF WIDTH=30><FONT SIZE=1 COLOR=#FFFFFF>.</FONT></TD>
<TD BGCOLOR=#FFFFFF WIDTH=162 ALIGN=LEFT><FONT SIZE=3 COLOR=#000000><A
HREF="mbot36.cfm?cty=36061&cv=Centerville&sptr=400&seqno=1&curft=8&len=2
&opt=401_1&bw=480&#bot">E 4th St</A></FONT></TD>
</TR>
<TR HEIGHT=4>
<TD BGCOLOR=#FFFFFF WIDTH=192 COLSPAN=2><FONT SIZE=1 COLOR=#FFFFFF><IMG
SRC="images/1.gif" width="1" height="1"></FONT></TD>
<TD BGCOLOR=#C0C0C0 WIDTH=29 COLSPAN=1><FONT SIZE=1 COLOR=#C0C0C0><IMG
SRC="images/1.gif" width="1" height="1"></FONT></TD>
<TD BGCOLOR=#C0C0C0 WIDTH=4><IMG SRC="images/ll4.gif" WIDTH="4"></TD>
<TD BGCOLOR=#808080 WIDTH=29 COLSPAN=3><FONT SIZE=1 COLOR=#808080><IMG
SRC="images/1.gif" width="1" height="1"></FONT></TD>
<TD BGCOLOR=#C0C0C0 WIDTH=4><IMG SRC="images/lr4.gif" WIDTH="4"></TD>
<TD BGCOLOR=#C0C0C0 WIDTH=29 COLSPAN=1><FONT SIZE=1 COLOR=#C0C0C0><IMG
SRC="images/1.gif" width="1" height="1"></FONT></TD>
<TD BGCOLOR=#FFFFFF WIDTH=192 COLSPAN=2><FONT SIZE=1 COLOR=#FFFFFF><IMG
SRC="images/1.gif" width="1" height="1"></FONT></TD>
</TR>
<TR HEIGHT=20 ALIGN="MIDDLE">
<TD BGCOLOR=#FFFFFF WIDTH=192 COLSPAN=2><FONT SIZE=1
COLOR=#FFFFFF>.</FONT></TD>
<TD WIDTH=29 HEIGHT=20 BGCOLOR=#FFFFFF COLSPAN=1><FONT SIZE=1
COLOR=#FF0000>498</FONT></TD>
<TD BGCOLOR=#C0C0C0 WIDTH=4><FONT SIZE=1 COLOR=#C0C0C0>.</FONT></TD>
<TD BGCOLOR=#808080 WIDTH=14><FONT SIZE=1 COLOR=#808080>.</FONT></TD>
<TD BGCOLOR=#FFFF00 WIDTH=1><IMG SRC="images/1.gif" width="1" height="1"></TD>
<TD BGCOLOR=#808080 WIDTH=14><FONT SIZE=1 COLOR=#808080>.</FONT></TD>
<TD BGCOLOR=#C0C0C0 WIDTH=4><FONT SIZE=1 COLOR=#C0C0C0>.</FONT></TD>
```

TABLE 1-continued

```
<TD WIDTH=29 BGCOLOR=#FFFFFF COLSPAN=1><FONT SIZE=1
COLOR=#FF0000>499</FONT></TD>
<TD BGCOLOR=#FFFFFF WIDTH=192 COLSPAN=2 ALIGN=LEFT><FONT SIZE=1
COLOR=#FFFFFF></FONT></TD>
</TR>
<TR HEIGHT=20 ALIGN="MIDDLE">
<TD BGCOLOR=#FFFFFF WIDTH=192 COLSPAN=2 ALIGN=RIGHT><FONT SIZE=1
COLOR=#000000></FONT>
<FONT SIZE=3><A HREF="buspage36.cfm?bw=480&a=490&b=Red%20Oak%20Hotel&p=
&n=Center&t=St&s=&cv=Centerville&h=11911&g=1">Red Oak Hotel/A></FONT></TD>
<TD WIDTH=29 HEIGHT=20 ALIGN="MIDDLE" BGCOLOR=#FFFFFF COLSPAN=1><FONT
SIZE=1 COLOR=#000000>490</FONT></TD>
<TD BGCOLOR=#C0C0C0 WIDTH=4><FONT SIZE=1 COLOR=#C0C0C0>.</FONT></TD>
<TD BGCOLOR=#808080 WIDTH=14><FONT SIZE=1 COLOR=#808080>.</FONT></TD>
<TD BGCOLOR=#808080 WIDTH=1><IMG SRC="images/1.gif" width"1" height=1></TD>
<TD BGCOLOR=#808080 WIDTH=14><FONT SIZE=1 COLOR=#808080>.</FONT></TD>
<TD BGCOLOR=#C0C0C0 WIDTH=4><FONT SIZE=1 COLOR=#C0C0C0>.</FONT></TD>
<TD WIDTH=29 ALIGN="MIDDLE" BGCOLOR=#FFFFFF COLSPAN=1></TD>
<TD BGCOLOR=#FFFFFF WIDTH=192 COLSPAN=2 ALIGN=LEFT><FONT SIZE=1
COLOR=#FFFFFF>.</FONT></TD>
</TR>
<TR HEIGHT=20 ALIGN="MIDDLE">
<TD BGCOLOR=#FFFFFF WIDTH=192 COLSPAN=2><FONT SIZE=1
COLOR=#FFFFFF>.</FONT></TD>
<TD WIDTH=29 ALIGN="MIDDLE" BGCOLOR=#FFFFFF COLSPAN=1></TD>
<TD BGCOLOR=#C0C0C0 WIDTH=4><FONT SIZE=1 COLOR=#C0C0C0>.</FONT></TD>
<TD BGCOLOR=#808080 WIDTH=14><FONT SIZE=1 COLOR=#808080>.</FONT></TD>
<TD BGCOLOR=#FFFF00 WIDTH=1><IMG SRC="images/1.gif" width="1" height="1"></TD>
<TD BGCOLOR=#808080 WIDTH=14><FONT SIZE=1 COLOR=#808080>.</FONT></TD>
<TD BGCOLOR=#C0C0C0 WIDTH=4><FONT SIZE=1 COLOR=#C0C0C0>.</FONT></TD>
<TD WIDTH=29 ALIGN="MIDDLE" BGCOLOR=#FFFFFF COLSPAN=1 ><FONT SIZE=1
COLOR=#000000>485</FONT></TD>
<TD BGCOLOR=#FFF00F WIDTH=192 COLSPAN=2 ALIGN=LEFT><FONT SIZE=3><A
HREF="buspage36.cfm?bw=480&a=485&b=King%20Barbers&p=&n=Center&t=Av&s=&cv=Centervil
le&h=7528&g=1">King Barbers</A></FONT></TD>
</TR>
<TR HEIGHT=20 ALIGN="MIDDLE">
<TD BGCOLOR=#FFFFFF WIDTH=192 COLSPAN=2 ALIGN=RIGHT><FONT SIZE=1
COLOR=#000000></FONT>
<FONT SIZE=3><A HREF="buspage36.cfm?bw=480&a=456&b=Video%20Express&p=&n=Center
&t=St&s=&cv=Centerville&h=11911&g=1">Video Express</A></FONT></TD>
<TD WIDTH=29 HEIGHT=20 ALIGN="MIDDLE" BGCOLOR=#FFFFFF COLSPAN=1><FONT
SIZE=1 COLOR=#FF0000>456</FONT></TD>
<TD BGCOLOR=#C0C0C0 WIDTH=4><FONT SIZE=1 COLOR=#C0C0C0>.</FONT></TD>
<TD BGCOLOR=#808080 WIDTH=14><FONT SIZE=1 COLOR=#808080>.</FONT></TD>
<TD BGCOLOR=#808080 WIDTH=1><IMG SRC=images/1.gif" width="1" height="1"></TD>
<TD BGCOLOR=#808080 WIDTH=14><FONT SIZE=1 COLOR=#808080>.</FONT></TD>
<TD BGCOLOR=#C0C0C0 WIDTH=4><FONT SIZE=1 COLOR=#C0C0C0>.</FONT></TD>
<TD WIDTH=29 ALIGN="MIDDLE"BGCOLOR=#FFFFFF COLSPAN=1></TD>
<TD BGCOLOR=#FFFFFF WIDTH=192 COLSPAN=2 ALIGN=LEFT><FONT SIZE=1
COLOR=#FFFFFF>.</FONT></TD>
</TR>
<TR HEIGHT=20 ALIGN="MIDDLE">
<TD BGCOLOR=#FFFFFF WIDTH=192 COLSPAN=2><FONT SIZE=1
COLOR=#FFFFFF>.</FONT></TD>
<TD WIDTH=29 ALIGN="MIDDLE"BGCOLOR=#FFFFFF COLSPAN=1></TD>
<TD BGCOLOR=#C0C0C0 WIDTH=4><FONT SIZE=1 COLOR=#C0C0C0>.</FONT></TD>
<TD BGCOLOR=#808080 WIDTH=14><FONT SIZE=1 COLOR=#808080>.</FONT></TD>
<TD BGCOLOR=#FFFF00 WIDTH=1><IMG SRC="images/1.gif" width="1" height="1"></TD>
<TD BGCOLOR=#808080 WIDTH=14><FONT SIZE=1 COLOR=#808080>.</FONT></TD>
<TD BGCOLOR=#C0C0C0 WIDTH=4><FONT SIZE=1 COLOR=#C0C0C0>.</FONT></TD>
<TD WIDTH=29 ALIGN="MIDDLE"BGCOLOR=#FFFFFF COLSPAN=1><FONT SIZE=1
COLOR=#FF0000>459</FONT></TD>
<TD BGCOLOR=#FFF00F WIDTH=192 COLSPAN=2 ALIGN=LEFT><FONT SIZE=3><A
HREF="buspage36.cfm?bw480&a=459&b=Bell%20Auto%20Parts&p=&n=Center&t=Av&s=
&cv=Centerville&h=7528&g=1">Bell Auto Parts</A></FONT></TD>
</TR>
<TR HEIGHT=4 ALIGN="MIDDLE">
<TD BGCOLOR=#FFFFFF WIDTH=192 COLSPAN2><FONT SIZE=1 COLOR=#FFFFFF><IMG
SRC="images/1.gif" width="1" height="1"></FONT></TD>
<TD BGCOLOR=#C0C0C0 WIDTH=29 COLSPAN=1><FONT SIZE=1 COLOR=#C0C0C0><IMG
SRC="images/1.gif" width="1" height="1"></FONT></TD>
<TD BGCOLOR=#808080 WIDTH=4><IMG SRC="images/ul4.gif" WIDTH=4></TD>
<TD BGCOLOR=#808080 COLSPAN=3 WIDTH=29><FONT SIZE=1 COLOR=#808080><IMG
SRC="images/1.gif" width="1" height="1"></FONT></TD>
<TD BGCOLOR=#808080 WIDTH=4><IMG SRC="images/ur4.gif" WIDTH="4"></TD>
<TD BGCOLOR=#C0C0C0 WIDTH=29 COLSPAN=1><FONT SIZE=1 COLOR=#C0C0C0><IMG
SRC="images/1.gif" width"1" height="1"></FONT></TD>
<TD BGCOLOR=#FFFFFF WIDTH=192 COLSPAN=2><FONT SIZE=1 COLOR=#FFFFFF><IMG
```

TABLE 1-continued

```
SRC="images/1.gif" width="1" height="1"></FONT></TD>
</TR>
<TR BGCOLOR=#808080" HEIGHT=22>
<TD BGCOLOR=#FFFFFF WIDTH=162 ALIGN=RIGHT HEIGHT=22>
<FONT SIZE=3 COLOR=#FFFFFF><A HREF="mbot36.cfm?cty36061&cv=Centerville&sptr301
&seqno=1&curft=7&len=2&opt=300__1&bw=480&#bot">W 3rd St</A></FONT></TD>
<TD BGCOLOR=#FFFFFF WIDTH=30><FONT SIZE=1 COLOR=#FFFFFF>.</FONT></TD>
<TD WIDTH=29><FONT SIZE=1 COLOR=#808080>.</FONT></TD>
<TD WIDTH=4><FONT SIZE=1 COLOR=#808080>.</FONT></TD>
<TD BGCOLOR=#808080 WIDTH=29 COLSPAN=3><FONT SIZE=1
COLOR=#808080>.</FONT></TD>
<TD WIDTH=4><FONT SIZE=1 COLOR=#808080>.</FONT></TD>
<TD WIDTH=29><FONT SIZE=1 COLOR=#808080>.</FONT></TD>
<TD BGCOLOR=#FFFFFF WIDTH=30><FONT SIZE=1 COLOR=#FFFFFF>.</FONT></TD>
<TD BGCOLOR=#FFFFFF WIDTH=162 ALIGN=LEFT>
<FONT SIZE=3 COLOR=#000000><A HREF="mbot36.cfm?cty=36061&cv=Centerville&sptr=300
&seqno=1&curft=8&len=2&opt=301__1&bw=480&#bot">E 3rd St</A></FONT></TD>
</TR>
<TR HEIGHT=4>
<TD BGCOLOR=#FFFFFF WIDTH=192 COLSPAN=2><FONT SIZE=1 COLOR=#FFFFFF><IMG
SRC="images/1.gif" width="1" height="1"></FONT></TD>
<TD BGCOLOR=#C0C0C0 WIDTH=29 COLSPAN=1><FONT SIZE=1 COLOR=#C0C0C0><IMG
SRC="images/1.gif" width="1" height="1"></FONT></TD>
<TD BGCOLOR=#C0C0C0 WIDTH=4><IMG SRC="images/ll4.gif" WIDTH="4"></TD>
<TD BGCOLOR=#808080 WIDTH=29 COLSPAN=3><FONT SIZE=1 COLOR=#808080><IMG
SRC="images/1.gif" width="1" height="1"></FONT></TD>
<TD BGCOLOR=#C0C0C0 WIDTH=4><IMG SRC="images/lr4.gif" WIDTH="4"></TD>
<TD BGCOLOR=#C0C0C0 WIDTH=29 COLSPAN=1><FONT SIZE=1 COLOR=#C0C0C0><IMG
SRC="images/1.gif" width="1" height="1"></FONT></TD>
<TD BGCOLOR=#FFFFFF WIDTH=192 COLSPAN=2><FONT SIZE=1 COLOR=#FFFFFF><IMG
SRC="images/1.gif" width="1" height="1"></FONT></TD>
</TR>
<TR HEIGHT=20 ALIGN="MIDDLE">
<TD BGCOLOR=#FFFFFF WIDTH=192 COLSPAN=2><FONT SIZE=1
COLOR=#FFFFFF>.</FONT></TD>
<TD WIDTH=29 HEIGHT=20 BGCOLOR=#FFFFFF COLSPAN=1><FONT SIZE=1
COLOR=#FF0000>454</FONT>.</TD>
<TD BGCOLOR=#C0C0C0 WIDTH=4><FONT SIZE=1 COLOR=#C0C0C0>.</FONT></TD>
<TD BGCOLOR=#808080 WIDTH=14><FONT SIZE=1 COLOR=#808080>.</FONT></TD>
<TD BGCOLOR=#FFFF00 WIDTH=1 ><IMG SRC="images/1.gif" width="1" height="1"></TD>
<TD BGCOLOR=#808080 WIDTH=14><FONT SIZE=1 COLOR=#808080>.</FONT></TD>
<TD BGCOLOR=#C0C0C0 WIDTH=4><FONT SIZE=1 COLOR=#C0C0C0>.</FONT></TD>
<TD WIDTH=29 BGCOLOR=#FFFFFF COLSPAN=1><FONT SIZE=1
COLOR=#FF0000>457</FONT></TD>
<TD BGCOLOR=#FFFFFF WIDTH=192 COLSPAN=2 ALIGN=LEFT><FONT SIZE=1
COLOR=#FFFFFF>.</FONT></TD>
</TR>
<TR HEIGHT=50 ALIGN="MIDDLE">
<TD BGCOLOR=#FFFFFF WIDTH=479 HEIGHT=50 COLSPAN=11><FONT SIZE=3
COLOR=#0000FF><A HREF="mbot36.cfm?cty=36061&cv=Centerville&sptr=100&seqno=1
&curft=7&len=2&opt=100__8&bw=480&#bot">Center Ave</A></FONT></TD>
</TR>
</TABLE>
</HTML>
```

TABLE 2

```
<?xml version="1.0"?>
<!DOCTYPE wml PUBLIC "-//WAPFORUM//DTD WML 1.2//EN"
"http://www.wapforum.org/DTD/wml12.dtd">
<wml>
<card id="200 E 49th St">
<p align="center" mode="wrap">
<a href="default.cfm?cv=Manhattan&bw=100" title="Search">Manhattan</a>
<table columns="3" align="RCL">
<tr><td/>
<td><small><a href="mbot36.cfm?cty=36061&cv=Manhattan&sptr=247&seqno=5
&curft=7&len=1&opt=247__6&bw=100&#bot" title="Next Block">E 49th
St</a></small></td>
<td/>
</tr>
<tr><td>
<small><a href="mbot36.cfm?cty=36061&cv=Manhattan&sptr=202&seqno=51&
curft=8&len=1&opt=202__52&bw=100&#bot" title="Left Turn">2nd
Ave</a></small><br/>
</td>
```

TABLE 2-continued

```
<td><img alt="road" src="images/st1.wbmp" align="middle"/></td>
<td>
<small><a href="mbot36.cfm?cty=36061&cv=Manhattan&sptr=202&seqno=52&
curft=7&len=1&opt=202_51&bw=100&#bot" title="Right Turn">2ndAve</a>
</small><br/>
</td>
</tr>
<tr>
<td><small>201</small></td>
<td><img alt="road" src="images/st2.wbmp"/></td>
<td><small>200</small></td>
</tr>
<tr>
<td><small>299</small></td>
<td><img alt="road" src="images/st2.wbmp"/></td>
<td><small>298</small></td>
</tr>
<tr><td>
<small><a href="mbot36.cfm?cty=36061&cv=Manhattan&sptr=225&seqno=43&
curft=8&len=1&opt=225_44&bw=100&#bot" title="Left Turn">3rd
Ave</a></small><br/>
</td>
<td><img alt="road" src="images/st1.wbmp" align="middle"/></td>
<td>
<small><a href="mbot36.cfm?cty=36061&cv=Manhattan&sptr=225&seqno=44&
curfrt=7&len=1&opt=225_43&bw=100&#bot" title="Right Turn">3rd
Ave</a></small><br/>
</td>
</tr>
<tr><td/>
<td><small><a href="mbot36.cfm?cty=36061&cv=Manhattan&sptr=247&seqno=5
&curft=7&len=1&opt=247_4&bw=100&#bot" title="Next Block">E 49th
St</a></small></td>
<td/>
</tr>
</table>
</p>
<do type="prev" label="Back">
<prev/>
</do>
</card>
</wml>
```

I claim:

1. A method of operating a computer system to provide a graphical user interface with a linear map component, the method comprising the steps of:

storing a database comprising a plurality of transportation segments;

retrieving a data subset from said database and formatting said data subset into a linear format such that said transportation segments from said data subset which are contiguous segments, and which occur along a projected path of travel are formatted to be depicted in a substantially straight and collinear manner;

displaying said data subset in said linear format;

wherein said projected path of travel comprises said contiguous segments having an angle formed between the adjoining end portions that falls within a predetermined angle range;

wherein said database further comprises transportation segment names associated with said transportation segments, and wherein the formatting step further comprises the formatting of said transportation segment names in said linear format, such that said transportation segment names are depicted in the proximity of said transportation segments to which they are associated;

wherein the formatting step further comprises the formatting of transportation segment links associated with and depicted in proximity to said transportation segments in said linear format, and wherein said transportation segment links are user selectable elements that serve to initiate the retrieval, formatting, and display of an associated subset of data in said linear format;

wherein said database further comprises a plurality of point of interest (POI) designators associated with said transportation segments, and wherein the formatting step further comprises the formatting of said POI designators in said linear format such that said POI designators are depicted in the proximity of said transportation segments to which they are associated;

wherein said database further comprises a plurality of POI links associated with said POI designators, and wherein the formatting step further comprises the formatting of said POI links in said linear format such that said POI links are depicted in the proximity of said POI designators to which they are associated, and wherein said POI links are user selectable elements that serve to initiate the display of additional POI information.

2. The method in claim 1, wherein the formatting step further comprises the formatting of a condition graphic, such that said condition graphic depicts conditions that exist in an individual transportation segment shown in said linear format, and wherein said condition graphic is located at a position along the depicted length of said individual transportation segment indicative of the relative position at which the condition occurs.

3. The method in claim 1, wherein the formatting step further comprises the formatting of said POI designators into a scrollable list box to be depicted in said linear format, such that said scrollable list box comprises a listing of said POI designators associated with one of said transportation segments in said projected path of travel.

4. The method in claim 3, wherein the formatting step further comprises the formatting of a user position icon (UPI) to represent the position of the user at a location along the length of one of said transportation segments, and wherein the depicted portion of said listing of each of the scrollable list boxes shown in said linear format is modified by the movement of said UPI along said transportation segments such that the sliders and listings of said scrollable list boxes are scrolled to their topmost positions if said transportation segments to which they are associated appear entirely beneath an imaginary horizontal line through the center of said UPI, and the sliders and listings of said scrollable list boxes are scrolled to their bottommost positions if said transportation segments to which they are associated appear entirely above an imaginary horizontal line through the center of said UPI, and the sliders and listings of said scrollable list boxes are depicted as scrolled in proportion to the location of said UPI along the length of the associated transportation segment depicted in said linear format if the associated transportation segment is intersected by an imaginary horizontal line through the center of said UPI.

5. The method in claim 4, wherein said movement of said UPI includes updating the depicted location of said UPI in said linear format based upon location data received from a location determining device selected from the group consisting of a global positioning system receiver and a cellular telephone.

6. The method in claim 4, wherein said movement of said UPI includes the use of a manual input device.

7. The method in claim 1, wherein said linear format comprises a table written in a language selected from the group consisting of SGML, HTML, XML, XHTML, DHTML, and WML.

8. The method in claim 1, wherein the formatting step further comprises the formatting of a user position icon (UPI) to represent the position of the user at a location along the length of one of said transportation segments.

9. An apparatus for providing a graphical user interface with a linear map component, the apparatus comprising:
- a memory which is able to store a database comprising a plurality of transportation segments;
- a controller means which is operatively connected to said memory, and which is able to retrieve a data subset from said database, and wherein said controller means is further able to format said data subset into a linear format such that said transportation segments from said data subset which are contiguous segments, and which occur along a projected path of travel are formatted to be depicted in a substantially straight and collinear manner;
- a display means which is operatively connected to said controller means for displaying said data subset in said linear format;
- wherein said database further comprises transportation segment names associated with said transportation segments, and wherein said controller means further comprises the formatting of said transportation segment names in said linear format such that said transportation segment names are depicted in the proximity of said transportation segments to which they are associated;
- wherein said controller means further comprises the formatting of transportation segment links associated with and depicted in proximity to said transportation segments in said linear format, and wherein said transportation segment links are user selectable elements that serve to initiate the retrieval, formatting, and display of an associated subset of data in said linear format;
- wherein said database further comprises a plurality of point of interest (POI) designators associated with said transportation segments, and wherein said controller means further comprises the formatting of said POI designators in said linear format such that said POI designators are depicted in the proximity of said transportation segments to which they are associated;
- wherein said database further comprises a plurality of POI links associated with said POI designators, and wherein said controller means further comprises the formatting of said POI links in said linear format such that said POI links are depicted in the proximity of said POI designators to which they are associated, and wherein said POI links are user selectable elements that serve to initiate the display of additional POI information.

10. The apparatus in claim 9, wherein said controller means further comprises the formatting of a condition graphic, such that said condition graphic depicts conditions that exist in an individual transportation segment shown in said linear format, and wherein said condition graphic is located at a position along the depicted length of said individual transportation segment indicative of the relative position at which the condition occurs.

11. The apparatus in claim 9, wherein said controller means further comprises the formatting of said POI designators into a scrollable list box to be depicted in said linear format, such that said scrollable list box comprises a listing of said POI designators associated with one of said transportation segments in said projected path of travel.

12. The apparatus in claim 11, wherein said controller means further comprises the formatting of a user position icon (UPI) to represent the position of the user at a location along the length of one of said transportation segments, and wherein the depicted portion of said listing of each of the scrollable list boxes shown in said linear format is modified by said controller means as a result of movement of said UPI along said transportation segments.

13. The apparatus in claim 12, wherein said movement of said UPI includes updating the depicted location of said UPI in said linear format based upon location data received from a location determining device selected from the group consisting of a global positioning system receiver and a cellular telephone.

14. The apparatus in claim 12, wherein said movement of said UPI comprises the use of a manual input device.

15. The apparatus in claim 9, wherein said linear format comprises a table written in a language selected from the group consisting of SGML, HTML, XML, XHTML, DHTML, and WML.

16. The apparatus in claim 9, wherein said controller means further comprises the formatting of a user position icon (UPI) to represent the position of the user at a location along the length of one of said transportation segments.

17. A computer program product comprising a computer useable medium having structured data and computer readable program code means embodied in said medium for causing a computer to provide a graphical user interface with a linear map component, said structured data comprising:
  a database comprising a plurality of transportation segments; and
said computer readable program code means comprising:
first computer readable program code means for causing said computer to retrieve a data subset from said database;
second computer readable program code means causing said computer to format said data subset into a linear format such that said transportation segments from said data subset which are contiguous segments, and which occur along a projected path of travel are formatted to be depicted in a substantially straight and collinear manner;
third computer readable program code means for causing said computer to display said data subset in said linear format;
wherein said database further comprises transportation segment names associated with said transportation segments, and wherein said second computer readable program code means further causes said computer to format said transportation segment names in said linear format such that said transportation segment names are depicted in the proximity of said transportation segments to which they are associated;
wherein said second computer readable program code means further causes said computer to format transportation segment links associated with and depicted in proximity to said transportation segments in said linear format, and wherein said transportation segment links are user selectable elements that serve to initiate the retrieval, formatting, and display of an associated subset of data in said linear format;
wherein said database further comprises a plurality of point of interest (POI) designators associated with said transportation segments, and wherein said second computer readable program code means further causes said computer to format said POI designators in said linear format such that said POI designators are depicted in the proximity of said transportation segments to which they are associated; and
wherein said database further comprises a plurality of POI links associated with said POI designators, and wherein said second computer readable program code means further causes said computer to format said POI links in said linear format such that said POI links are depicted in the proximity of said POI designators to which they are associated, and wherein said POI links are user selectable elements that serve to initiate the display of additional point of interest information.

18. The computer program product in claim 17, wherein said second computer readable program code means further causes said computer to format a condition graphic, such that said condition graphic depicts conditions that exist in an individual transportation segment shown in said linear format, and wherein said condition graphic is located at a position along the depicted length of said individual transportation segment indicative of the relative position at which the condition occurs.

19. The computer program product in claim 17, wherein said second computer readable program code means further causes said computer to format said POI designators into a scrollable list box to be depicted in said linear format, such that said scrollable list box comprises a listing of said POI designators associated with one of said transportation segments in said projected path of travel.

20. The computer program product in claim 19, wherein said second computer readable program code means further causes said computer to format a user position icon (UPI) to represent the position of the user at a location along the length of one of said transportation segments, and wherein the depicted portion of said listing of each of the scrollable list boxes shown in said linear format is modified by said computer readable program code means as a result of movement of said UPI along said transportation segments.

21. The computer program product in claim 20, wherein said movement of said UPI includes updating the depicted location of said UPI in said linear format based upon location data received from a location determining device selected from the group consisting of a global positioning system receiver and a cellular telephone.

22. The computer program product in claim 20, wherein said movement of said UPI comprises the use of a manual input device.

23. The computer program product in claim 17, wherein said linear format comprises a table written in a language selected from the group consisting of SGML, HTML, XML, XHTML, DHTML, and WML.

24. The computer program product in claim 17, wherein said second computer readable program code means further causes said computer to format a user position icon (UPI) to represent the position of the user at a location along the length of one of said transportation segments.

* * * * *